US010335676B2

(12) United States Patent
Gohara

(10) Patent No.: US 10,335,676 B2
(45) Date of Patent: Jul. 2, 2019

(54) GAME SYSTEM, METHOD, AND NON-TRANSITORY COMPUTER-READABLE STORAGE MEDIUM WITH EXECUTABLE GAME PROGRAM STORED THEREON, WHICH CAN PROVIDE VIBRATION TO USER

(71) Applicant: NINTENDO CO., LTD., Kyoto-shi, Kyoto (JP)

(72) Inventor: Shigetoshi Gohara, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 15/623,821

(22) Filed: Jun. 15, 2017

(65) Prior Publication Data

US 2017/0361223 A1 Dec. 21, 2017

(30) Foreign Application Priority Data

Jun. 15, 2016 (JP) .................................. 2016-119089

(51) Int. Cl.
*A63F 9/00* (2006.01)
*A63F 13/245* (2014.01)
*A63F 13/285* (2014.01)
*A63F 13/803* (2014.01)
*A63F 13/211* (2014.01)
(Continued)

(52) U.S. Cl.
CPC .......... *A63F 13/245* (2014.09); *A63F 13/211* (2014.09); *A63F 13/24* (2014.09); *A63F 13/285* (2014.09); *A63F 13/5258* (2014.09); *A63F 13/803* (2014.09); *A63F 2300/1043* (2013.01)

(58) Field of Classification Search
None
See application file for complete search history.

(56) References Cited

U.S. PATENT DOCUMENTS 6,645,076 B1 * 11/2003 Sugai ...................... A63F 13/10
463/30
6,864,877 B2   3/2005 Braun et al.
(Continued)

FOREIGN PATENT DOCUMENTS

EP    2 810 699 A1   12/2014
GB    2508137 A       5/2014
(Continued)

OTHER PUBLICATIONS

Immersion, Patent Markings, retrieved Aug. 7, 2018, 2 pages. https://www.immersion.com/legal/trademarks-and-patent-markings/.

*Primary Examiner* — Seng Heng Lim
(74) *Attorney, Agent, or Firm* — Nixon & Vanderhye PC

(57) ABSTRACT

In a game system, one or more processors provide such a screen representation that an object moving in a virtual space turns left in accordance with a first operation input by a user onto an operation portion and such a screen representation that an object moving in the virtual space turns right in accordance with a second operation input by the user onto the operation portion. The one or more processors vibrate a first vibration portion more strongly than a second vibration portion when the screen representation that the object turns left is provided and vibrate the second vibration portion more strongly than the first vibration portion when the screen representation that the object turns right is provided.

35 Claims, 23 Drawing Sheets

(51) Int. Cl.
*A63F 13/24* (2014.01)
*A63F 13/5258* (2014.01)

(56) References Cited

U.S. PATENT DOCUMENTS

| | | | |
|---|---|---|---|
| 7,070,507 B2* | 7/2006 | Nishiumi | A63F 13/06 463/30 |
| 7,733,637 B1* | 6/2010 | Lam | G06F 1/1626 361/679.08 |
| 8,059,089 B2* | 11/2011 | Daniel | A63F 13/06 345/156 |
| 8,972,617 B2* | 3/2015 | Hirschman | G06F 3/0219 463/37 |
| 9,118,750 B2* | 8/2015 | Vossoughi | B60R 11/02 |
| 9,126,119 B2* | 9/2015 | Joynes | A63F 13/23 |
| 9,529,447 B2* | 12/2016 | Hodges | G06F 1/1632 |
| 9,711,980 B2* | 7/2017 | Hodges | H02J 7/0042 |
| 9,753,537 B2* | 9/2017 | Obana | G06F 3/016 |
| 9,808,713 B1* | 11/2017 | Townley | A63F 13/24 |
| 9,833,702 B2 | 12/2017 | Obana et al. | |
| 9,855,498 B2* | 1/2018 | Townley | A63F 13/24 |
| 2002/0155890 A1* | 10/2002 | Ha | A63F 13/06 463/36 |
| 2004/0023719 A1* | 2/2004 | Hussaini | A63F 13/06 463/37 |
| 2006/0046843 A1 | 3/2006 | Nakajima | |
| 2006/0290662 A1 | 12/2006 | Houston et al. | |
| 2009/0131171 A1* | 5/2009 | Miyazaki | A63F 13/10 463/37 |
| 2010/0250815 A1* | 9/2010 | Street | G06F 1/1626 710/303 |
| 2011/0134034 A1* | 6/2011 | Daniel | A63F 13/06 345/158 |
| 2011/0260969 A1* | 10/2011 | Workman | G06F 3/0202 345/161 |
| 2011/0260996 A1 | 10/2011 | Henricson | |
| 2013/0095925 A1* | 4/2013 | Xu | G06F 1/1626 463/37 |
| 2013/0178285 A1* | 7/2013 | Joynes | G06F 3/0219 463/31 |
| 2013/0178290 A1* | 7/2013 | Joynes | G06F 3/0219 463/37 |
| 2013/0267322 A1* | 10/2013 | South | A63F 13/06 463/38 |
| 2013/0281212 A1 | 10/2013 | Tsuchiya et al. | |
| 2013/0318438 A1 | 11/2013 | Afshar | |
| 2014/0184508 A1* | 7/2014 | Tamasi | G06F 1/1632 345/161 |
| 2014/0206451 A1* | 7/2014 | Helmes | G06F 1/1632 463/39 |
| 2014/0210756 A1* | 7/2014 | Lee | G06F 3/016 345/173 |
| 2014/0247246 A1* | 9/2014 | Maus | G06F 3/044 345/174 |
| 2014/0274394 A1* | 9/2014 | Willis | G06F 1/1632 463/37 |
| 2015/0084900 A1* | 3/2015 | Hodges | G06F 1/1632 345/173 |
| 2015/0205328 A1* | 7/2015 | Lin | G06F 1/1632 361/679.44 |
| 2015/0209668 A1* | 7/2015 | Obana | A63F 13/285 463/31 |
| 2015/0263685 A1* | 9/2015 | Obana | H03G 3/3005 381/104 |
| 2015/0323996 A1* | 11/2015 | Obana | G06F 3/016 345/177 |
| 2016/0209968 A1* | 7/2016 | Taylor | G06F 3/0416 |
| 2016/0231773 A1* | 8/2016 | Inoue | G06F 1/1607 |
| 2017/0176202 A1* | 6/2017 | Anderson | G01C 21/3492 |

FOREIGN PATENT DOCUMENTS

| | | |
|---|---|---|
| JP | 2004-057654 | 2/2004 |
| JP | 2006-068210 | 3/2006 |
| JP | 2013-236909 | 11/2013 |
| WO | 2011/043292 | 4/2011 |
| WO | 2013/049248 | 4/2013 |

* cited by examiner

FIG.1
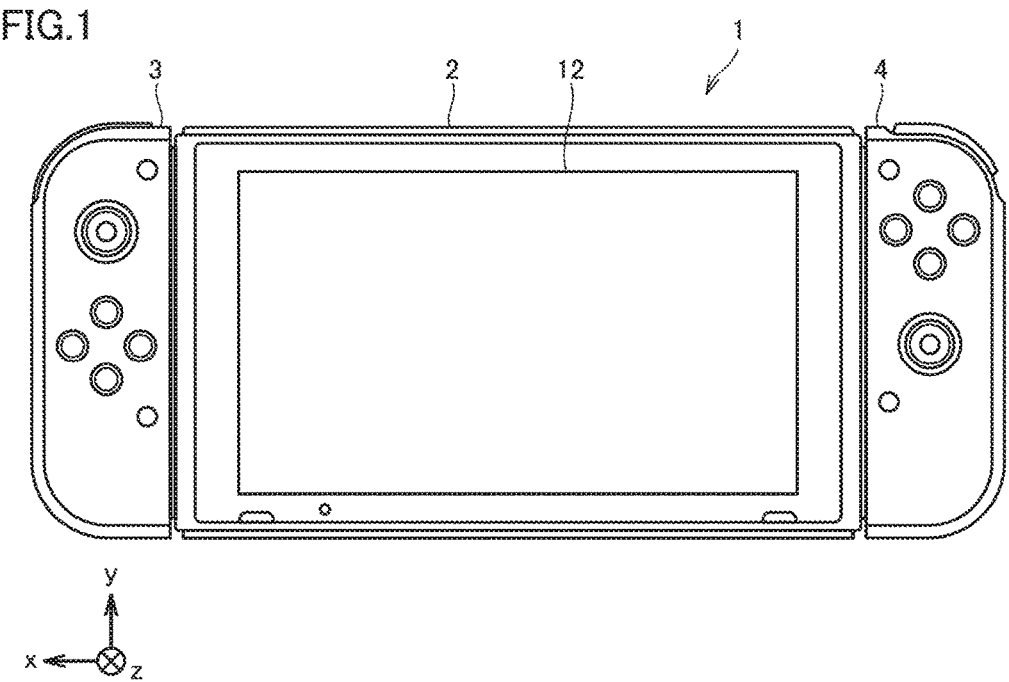
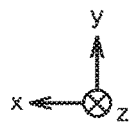

FIG.11
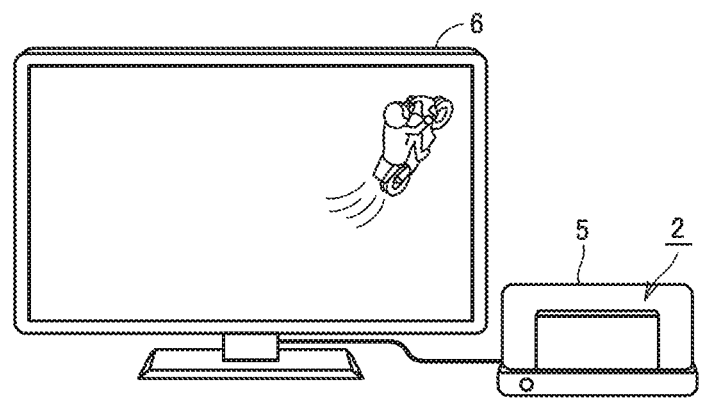
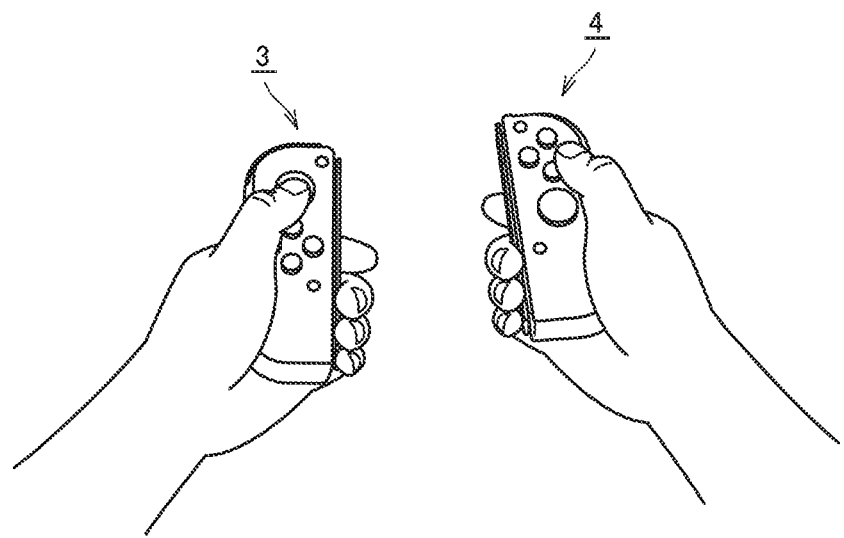

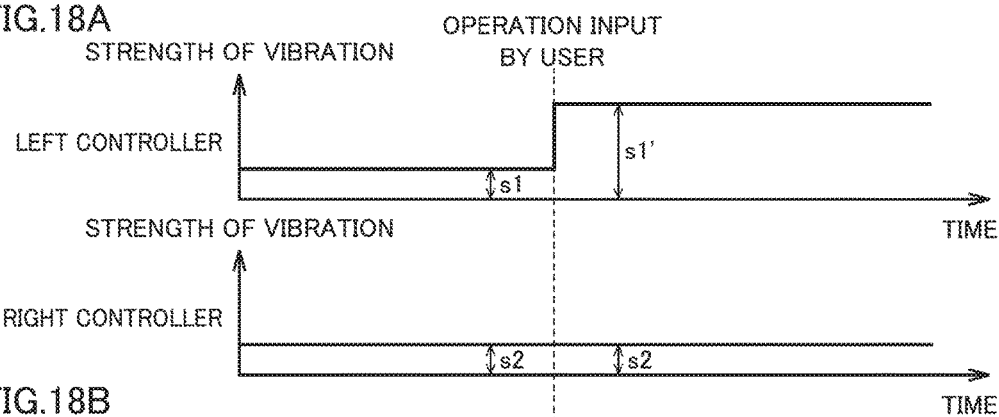
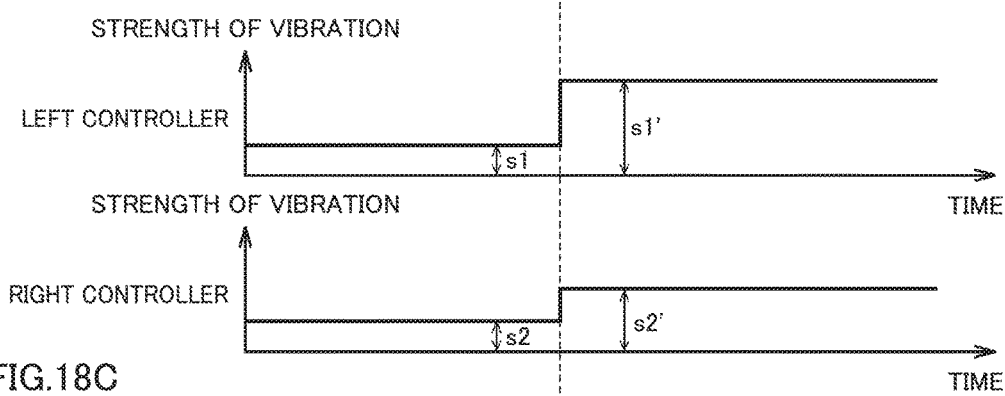
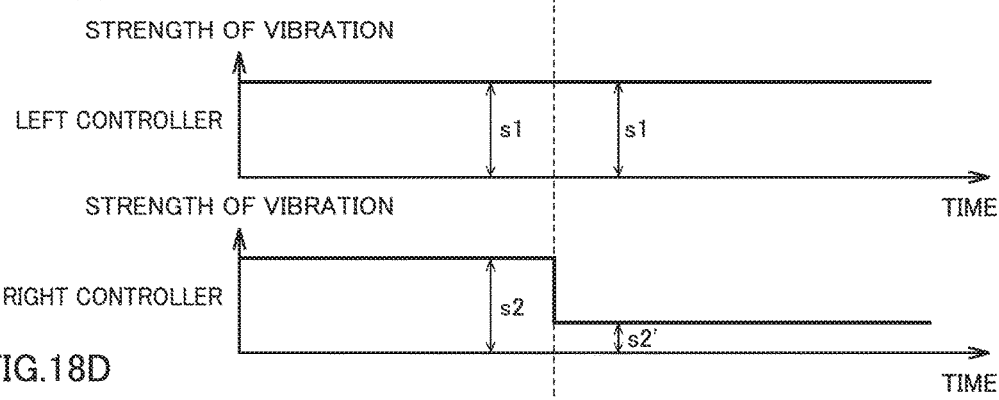
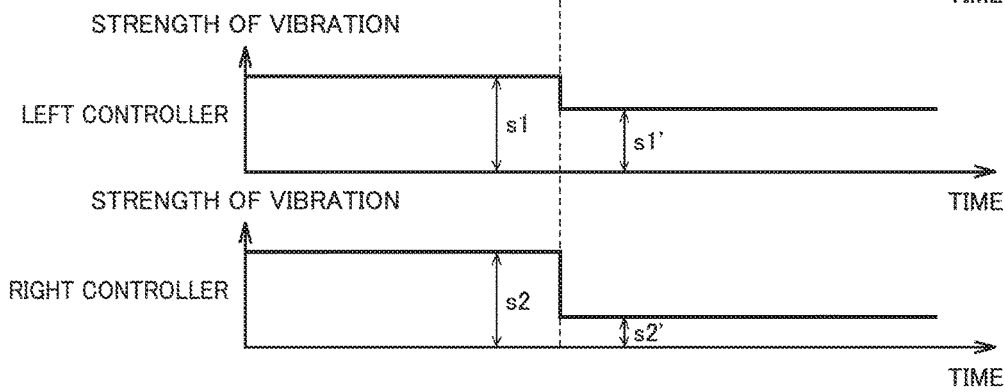

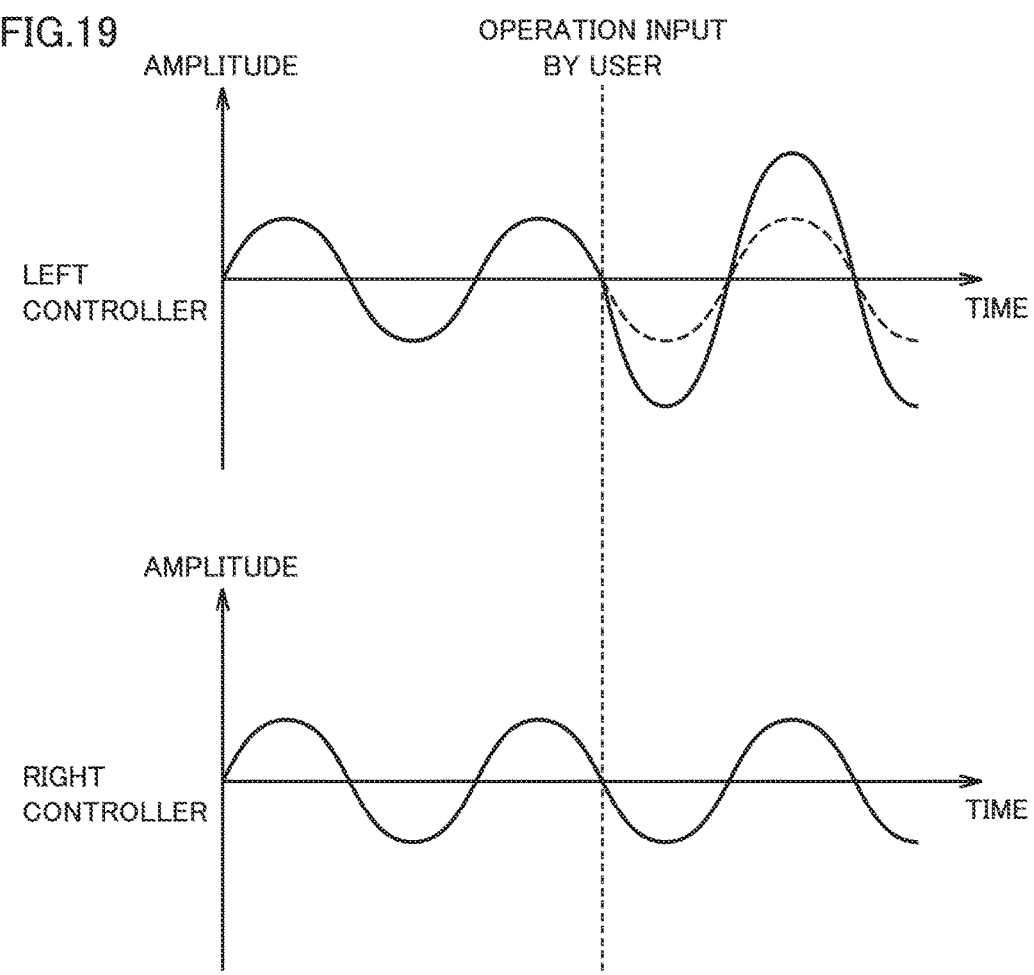

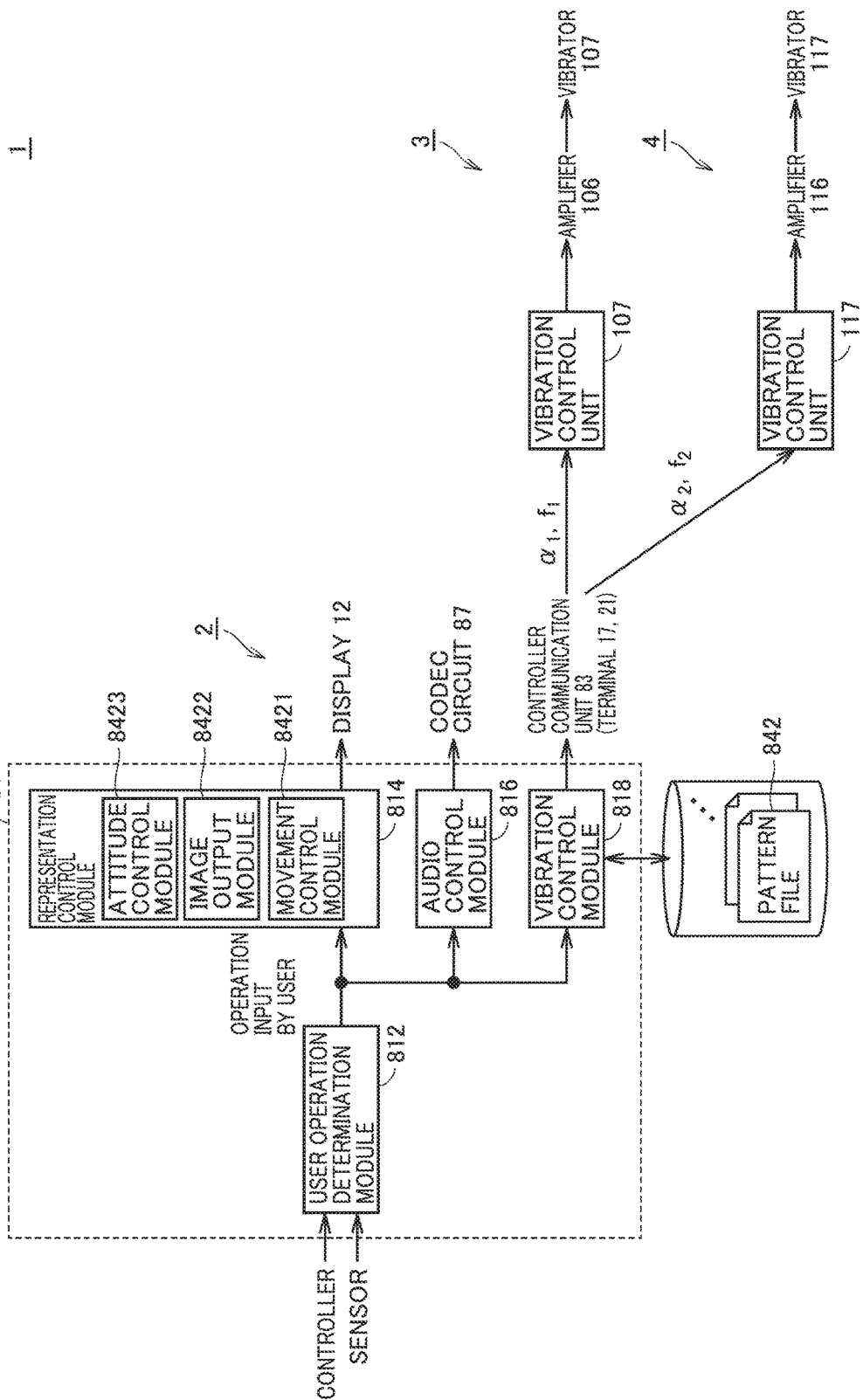

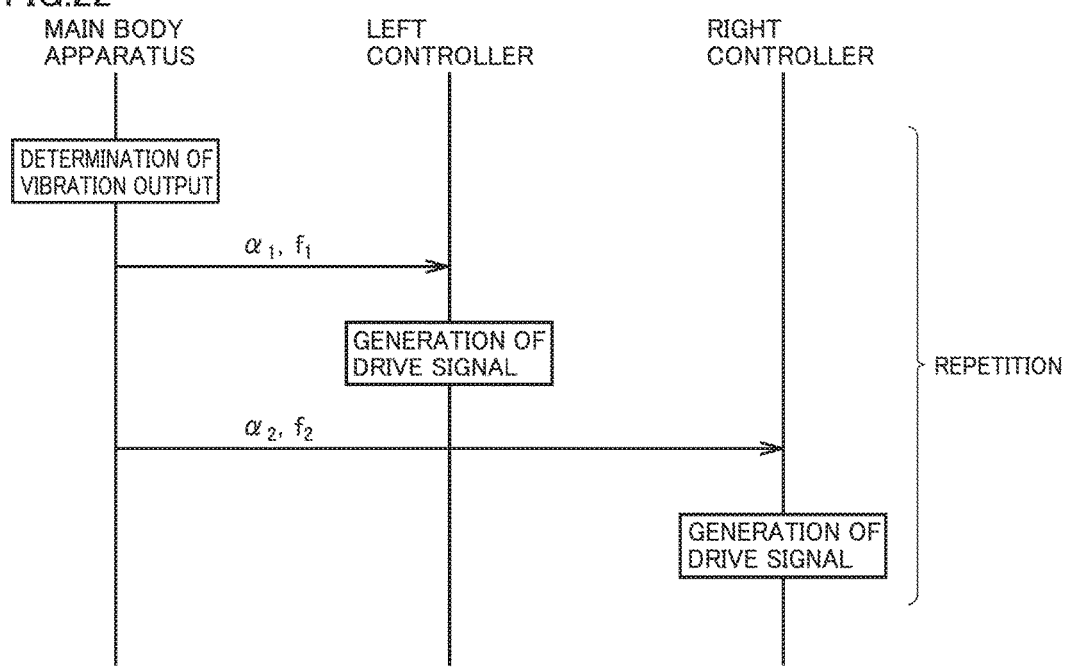

GAME SYSTEM, METHOD, AND NON-TRANSITORY COMPUTER-READABLE STORAGE MEDIUM WITH EXECUTABLE GAME PROGRAM STORED THEREON, WHICH CAN PROVIDE VIBRATION TO USER

This nonprovisional application is based on Japanese Patent Application No. 2016-119089 filed with the Japan Patent Office on Jun. 15, 2016, the entire contents of which are hereby incorporated by reference.

FIELD

The present technology relates to a game system, a method, and a non-transitory computer-readable storage medium with an executable game program stored thereon, which can provide vibration to a user.

BACKGROUND AND SUMMARY

Game processing making use of vibration has conventionally been proposed. A configuration which can give a new operational feeling by changing vibration depending on a difference in manner of screen representation of a character has been disclosed. A configuration in which a vibration portion generating vibration based on a control signal from an information processing apparatus is arranged in a grip portion has been disclosed.

An exemplary embodiment provides a novel game system in which a vibration portion is arranged in each of portions held with hands of a user and the vibration portion is appropriately controlled.

An exemplary embodiment provides a game system that includes a first vibration portion arranged in a portion held with one hand of a user and a second vibration portion arranged in a portion held with the other hand of the user, an operation portion which accepts an operation input by the user, and one or more processors. The one or more processors provide such a screen representation that an object moving in a virtual space turns left in accordance with a first operation input by the user onto the operation portion and provide such a screen representation that the object moving in the virtual space turns right in accordance with a second operation input by the user onto the operation portion. The one or more processors further vibrate the first vibration portion more strongly than the second vibration portion when the screen representation that the object turns left is provided and vibrate the second vibration portion more strongly than the first vibration portion when the screen representation that the object turns right is provided.

The operation portion may include a direction instruction portion which accepts an operation input to indicate a direction. The one or more processors may provide the screen representation that the object turns left in accordance with the first operation input by the user to indicate a left direction onto the direction instruction portion and provide the screen representation that the object turns right in accordance with the second operation input by the user to indicate a right direction onto the direction instruction portion.

The virtual space may be a 3D virtual space.

The one or more processors may control movement of the object in the virtual space in accordance with the operation input by the user onto the operation portion and output an image generated by shooting the virtual space with a virtual camera. The process of controlling movement may include controlling movement such that the object turns left with respect to a direction of travel of the object in accordance with the first operation input by the user and controlling movement such that the object turns right with respect to the direction of travel of the object in accordance with the second operation input by the user. The process of outputting an image may include controlling an orientation of the virtual camera such that the virtual camera can change a direction of shooting of the object.

The one or more processors may control the object such that the object turns left or right with respect to a direction of travel of the object in accordance with the operation input by the user onto the direction instruction portion and control the object such that the object moves forward in accordance with the operation input by the user onto the operation portion different from the direction instruction portion.

The one or more processors may vibrate the first vibration portion more strongly while the second vibration portion is kept vibrated before and after the first operation input by the user or the second operation input by the user onto the operation portion.

The one or more processors may keep vibration of the second vibration portion unchanged before and after the first operation input by the user or the second operation input by the user onto the operation portion.

The one or more processors may make vibration of the first vibration portion stronger than the second vibration portion and stronger than before change.

The operation portion may accept a direction instruction as an analog input. The one or more processors may increase strength of vibration of the first vibration portion in accordance with magnitude of the analog input.

The one or more processors may adjust strength of vibration by changing an amplitude while a frequency of vibration of the vibration portion is maintained.

The operation portion may include a sensor which can detect tilt of the operation portion by the user. The one or more processors may provide the screen representation that the object turns left or the screen representation that the object turns right in accordance with an output from the sensor.

The one or more processors may provide a screen representation that the object is tilted to left when the screen representation that the object turns left is provided and provide a screen representation that the object is tilted to right when the screen representation that the object turns right is provided.

The one or more processors may provide a screen representation that an attitude of the object moving in the virtual space is changed to left in accordance with the first operation input by the user onto the operation portion and provide a screen representation that the attitude of the object moving in the virtual space is changed to right in accordance with the second operation input by the user onto the operation portion.

The operation portion may be configured separately from a main body which performs game processing.

The operation portion may be constituted of a first portion held with one hand of the user and a second portion held with the other hand of the user which are separate from each other.

The first vibration portion may be arranged in the first portion and the second vibration portion may be arranged in the second portion.

The main body may include a display which shows the virtual space and the object in the virtual space.

The operation portion may be used even while the operation portion is attached to the main body.

While the operation portion is attached to the main body, a vibration control signal may be transmitted from the main body to the vibration portion through a wire. While the operation portion is detached from the main body, a vibration control signal may wirelessly be transmitted from the main body to the vibration portion.

The one or more processors may generate a first command including a first amplitude and a first frequency for vibrating the first vibration portion and a second command including a second amplitude and a second frequency for vibrating the second vibration portion.

The first vibration portion and the second vibration portion may be capable of a first manner in which the first vibration portion and the second vibration portion are separately configured as being held with respective hands of the user and a second manner in which the first vibration portion and the second vibration portion are configured as being integrated. The one or more processors may be able to vibrate the first vibration portion and the second vibration portion in any of the first manner and the second manner.

An exemplary embodiment provides a game system that includes a first vibration portion arranged in a portion held with a left hand of a user and a second vibration portion arranged in a portion held with a right hand of the user, an operation portion which accepts an operation input by the user, and one or more processors. The one or more processors provide such a screen representation that an object moving in a virtual space turns left in accordance with a first game operation input by the user onto the operation portion and provide such a screen representation that the object moving in the virtual space turns right in accordance with a second operation input by the user onto the operation portion. The one or more processors further vibrate the first vibration portion more strongly than the second vibration portion when the screen representation that the object turns left is provided and vibrate the second vibration portion more strongly than the first vibration portion when the screen representation that the object turns right is provided.

An exemplary embodiment provides a game system that includes a first vibration portion arranged in a portion held with a left hand of a user and a second vibration portion arranged in a portion held with a right hand of the user, an operation portion which accepts an operation input by the user, and one or more processors. The one or more processors provide such a screen representation that an object moving in a virtual space turns left in accordance with a first operation input by the user onto the operation portion and provide such a screen representation that the object moving in the virtual space turns right in accordance with a second operation input by the user onto the operation portion. The one or more processors further vibrate the first vibration portion more strongly than the second vibration portion when the screen representation that the object turns right is provided and vibrate the second vibration portion more strongly than the first vibration portion when the screen representation that the object turns left is provided.

An exemplary embodiment provides a game system that includes a first vibration portion arranged in a portion held with one hand of a user and a second vibration portion arranged in a portion held with the other hand of the user, an operation portion which accepts an operation input by the user, and one or more processors. The one or more processors provide such a screen representation that an attitude of an object moving in a virtual space is changed to left in accordance with a first operation input by the user onto the operation portion and provide such a screen representation that the attitude of the object moving in the virtual space is changed to right in accordance with a second operation input by the user onto the operation portion. The one or more processors may vibrate the first vibration portion more strongly than the second vibration portion when the screen representation that the attitude of the object is changed to the left is provided and vibrate the second vibration portion more strongly than the first vibration portion when the screen representation that the attitude of the object is changed to the right is provided.

An exemplary embodiment provides a method performed in a game device including a first vibration portion arranged in a portion held with one hand of a user and a second vibration portion arranged in a portion held with the other hand of the user. The method includes accepting an operation input by the user, providing such a screen representation that an object moving in a virtual space turns left in accordance with a first operation input by the user, providing such a screen representation that the object moving in the virtual space turns right in accordance with a second operation input by the user, vibrating the first vibration portion more strongly than the second vibration portion when the screen representation that the object turns left is provided, and vibrating the second vibration portion more strongly than the first vibration portion when the screen representation that the object turns right is provided.

An exemplary embodiment provides a non-transitory computer-readable storage medium with an executable game program stored thereon, and the game program is executed by a processor of a game device including a first vibration portion arranged in a portion held with one hand of a user and a second vibration portion arranged in a portion held with the other hand of the user. The game program causes the processor to perform accepting an operation input by the user, providing such a screen representation that an object moving in a virtual space turns left in accordance with a first operation input by the user, providing such a screen representation that the object moving in the virtual space turns right in accordance with a second operation input by the user, vibrating the first vibration portion more strongly than the second vibration portion when the screen representation that the object turns left is provided, and vibrating the second vibration portion more strongly than the first vibration portion when the screen representation that the object turns right is provided.

According to the present technology, a vibration portion is arranged in each of portions held with hands of a user and the vibration portion can appropriately be controlled.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIGS. 1 and 2 show exemplary illustrative non-limiting drawings illustrating appearance of a game device according to the present embodiment.

FIG. 11 shows an exemplary illustrative non-limiting drawing illustrating one example of a manner of use of the game device with the main body apparatus being attached to the cradle.

FIGS. 18A to 18D show exemplary illustrative non-limiting time charts illustrating examples of manner of change in strength of vibration in game processing according to the present embodiment.

FIG. 19 shows an exemplary illustrative non-limiting drawing illustrating a method of expressing change in vibration in the game device according to the present embodiment.

FIG. 21 shows an exemplary illustrative non-limiting block diagram illustrating a mount example involved with game processing according to the present embodiment.

FIG. 22 shows an exemplary illustrative non-limiting drawing illustrating one example of a communication sequence between the main body apparatus and the controllers in the game device according to the present embodiment.

DETAILED DESCRIPTION OF NON-LIMITING EXAMPLE EMBODIMENTS

Figure 2:
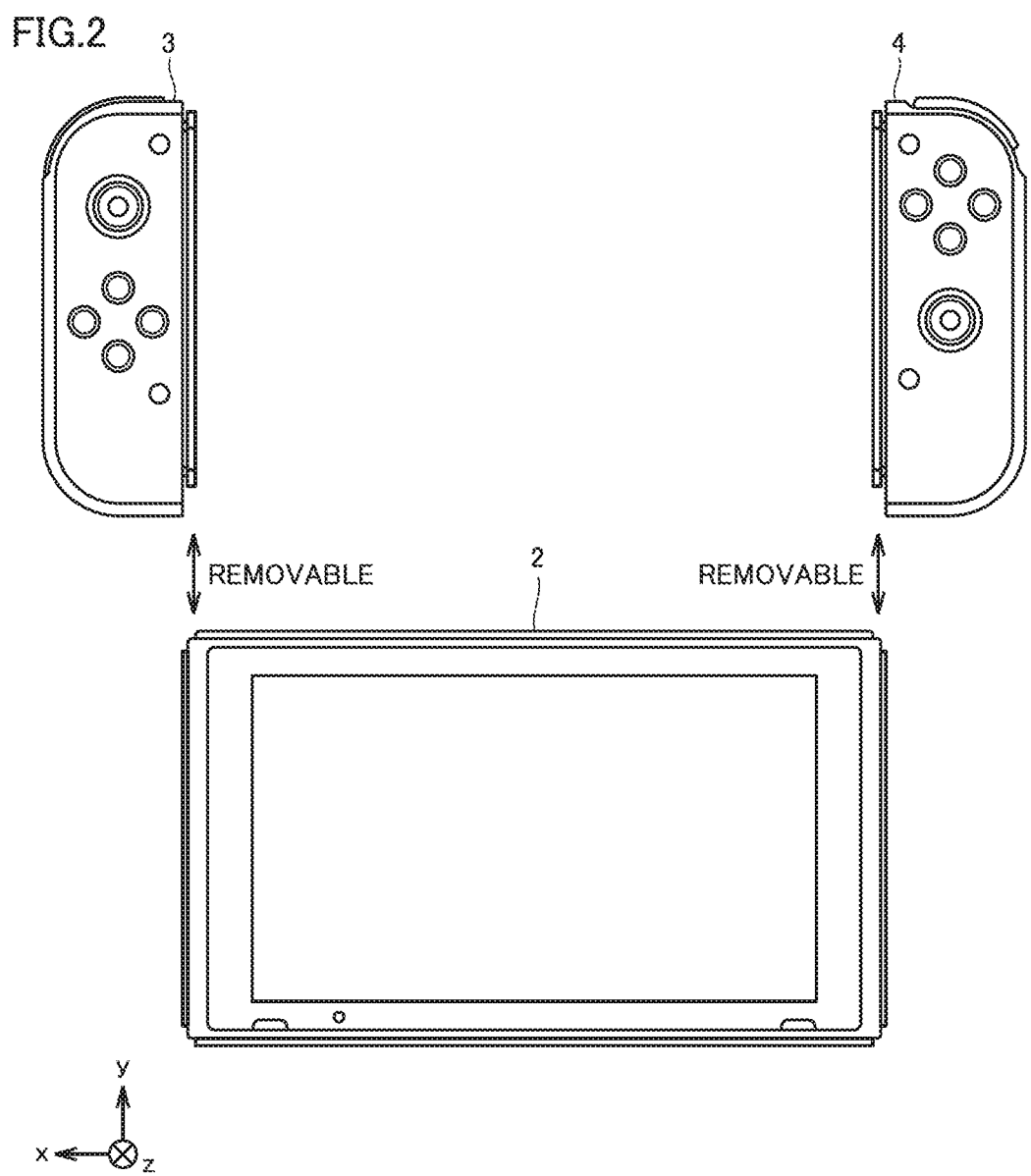

The present embodiment will be described in detail with reference to the drawings. The same or corresponding elements in the drawings have the same reference characters allotted and description thereof will not be repeated.

[A. Apparatus Configuration]

An apparatus configuration relating to a game system according to the present embodiment will initially be described. The game system according to the present embodiment is configured at least with a game device described below.

(a1: Overall Configuration of Game Device)

An overall configuration of a game device 1 according to the present embodiment will be described with reference to FIGS. 1 and 2. As shown in FIGS. 1 and 2, game device 1 includes a main body apparatus 2, a left controller 3, and a right controller 4. Main body apparatus 2 includes a display 12 representing one example of a display portion and performs various types of processing including game processing in game device 1.

As shown in FIG. 2, left controller 3 and right controller 4 may be constructed as being detachable from main body apparatus 2. Left controller 3 and right controller 4 may integrally be constructed or left controller 3 and right controller 4 may be constructed as separate apparatuses. Thus, left controller 3 and right controller 4 corresponding to an operation portion may be constructed separately from main body apparatus 2.

Left controller 3 can be attached to a left side (a side of a positive direction of an x axis shown in FIG. 1) of main body apparatus 2. Right controller 4 can be attached to a right side (a side of a negative direction of the x axis shown in FIG. 1) of main body apparatus 2. In the description below, left controller 3 and right controller 4 may collectively be referred to as a "controller". A more specific configuration example of main body apparatus 2, left controller 3, and right controller 4 will be described below.

(a2: Structure of Main Body Apparatus)

Figure 3:
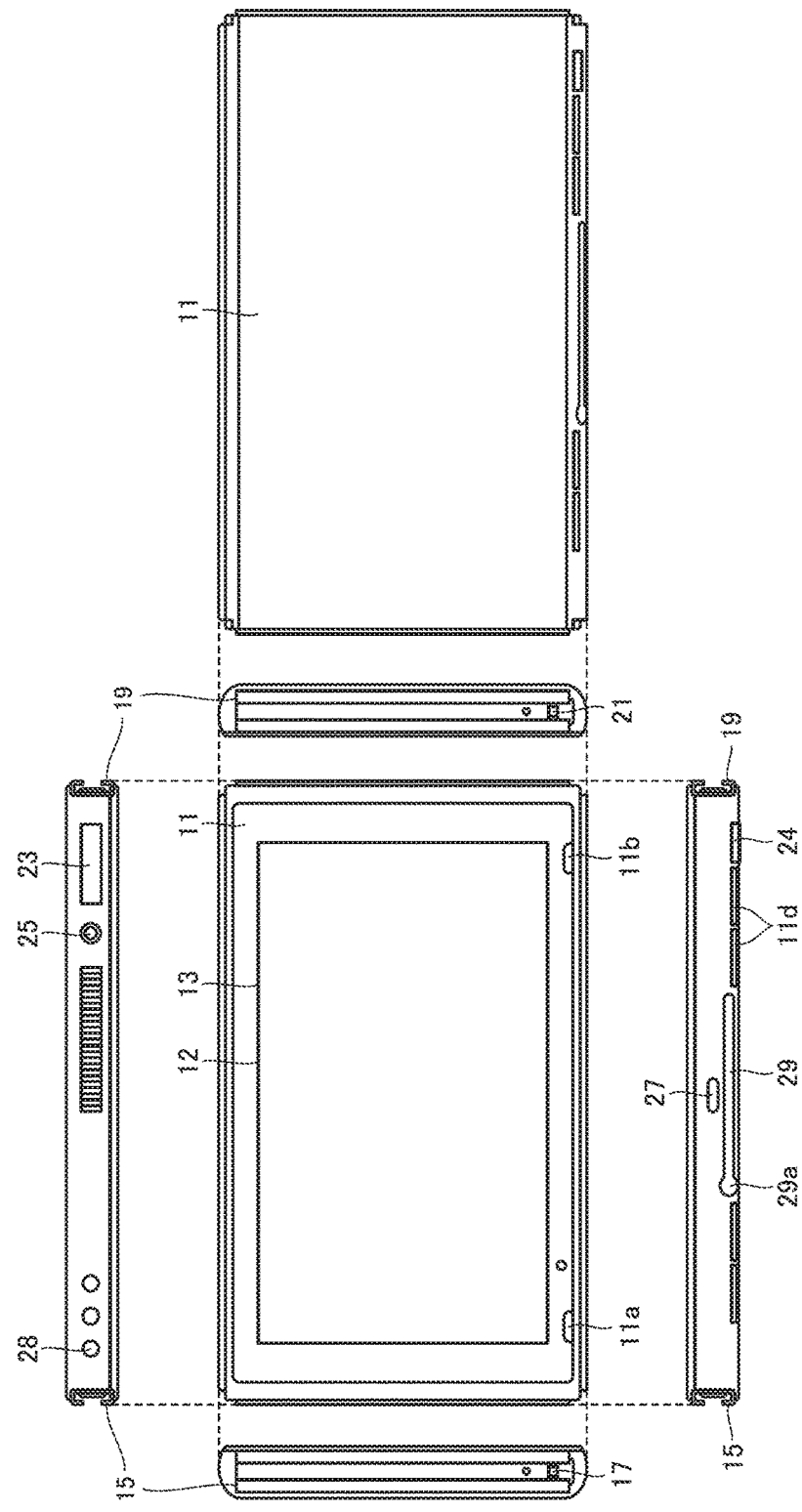
FIG. 3 shows an exemplary illustrative non-limiting diagram illustrating a main body apparatus according to the present embodiment when viewed from six sides.

Referring to the view from six sides of main body apparatus 2 according to the present embodiment shown in FIG. 3, main body apparatus 2 has a housing 11 substantially in a form of a plate. A main surface of housing 11 (that is, a front surface or a surface where display 12 is provided) is substantially in a rectangular shape. In the description below, housing 11 is in a horizontally long shape and a longitudinal direction of the main surface (that is, the direction of the x axis shown in FIG. 1) is referred to as a lateral direction (or a left-right direction) and a direction of a short side of the main surface (that is, a direction of a y axis shown in FIG. 1) is referred to as a vertical direction (or an up-down direction). A direction perpendicular to the main surface of housing 11 (that is, a direction of a z axis shown in FIG. 1) is referred to as a direction of depth (or a front-rear direction).

Main body apparatus 2 can be used with its main surface being laterally oriented or with its surface being vertically oriented when a user holds the main body apparatus. Therefore, denotation as the lateral direction and the vertical direction is given for the sake of convenience of description.

A shape and a size of housing 11 can arbitrarily be designed. For example, in another embodiment, a protrusion portion or a grip portion for facilitating holding by a user may be added to housing 11.

(1) Member Provided on Main Surface of Housing 11

As shown in FIGS. 1 to 3, display 12 is provided on the main surface of housing 11 of main body apparatus 2. Display 12 shows an image obtained or generated by main body apparatus 2 (which may be a still image or moving images). When game processing is performed, display 12 shows a virtual space and an object in the virtual space. Though display 12 is typically implemented by a liquid crystal display (LCD), a display apparatus of any type can be adopted.

A touch panel 13 is provided on a screen of display 12. Typically, a device of a type accepting a multi-touch input (for example, a capacitance type) is adopted as touch panel 13. For example, a device of any type such as a device of a type accepting a single-touch input (for example, a resistive film type) can be adopted as touch panel 13.

Speaker holes 11a and 11b are provided in the main surface of housing 11 of main body apparatus 2 and sound generated from a speaker (a speaker 88 shown in FIG. 7) arranged in housing 11 is output through speaker holes 11a and 11b.

Two speakers are provided in main body apparatus 2 and speaker holes 11a and 11b are provided in correspondence with respective positions of a left speaker and a right speaker. Speaker hole 11a is provided on a left side of display 12 in correspondence with the left speaker and speaker hole 11b is provided on a right side of display 12 in correspondence with the right speaker.

A position, a shape, and the number of speaker holes 11a and 11b can arbitrarily be designed. For example, in another embodiment, speaker holes 11a and 11b may be provided in a side surface or a rear surface of housing 11.

(2) Member Provided on Left Side Surface of Housing 11

A left rail member 15 for removably attaching left controller 3 to main body apparatus 2 is provided in a left side surface of housing 11. Left rail member 15 extends along the up-down direction in the left side surface of housing 11. Left rail member 15 is in a shape allowing engagement thereof with a slider (a slider 40 shown in FIG. 4) for left controller 3. A slide mechanism is formed by left rail member 15 and slider 40. With such a slide mechanism, left controller 3 can slidably and removably be attached to main body apparatus 2.

A left terminal 17 is provided in the left side surface of housing 11. Left terminal 17 is a terminal for wired communication between main body apparatus 2 and left controller 3. Left terminal 17 is provided at a position where it comes in contact with a terminal (a terminal 42 shown in FIG. 4) of left controller 3 when left controller 3 is attached to main body apparatus 2. Left terminal 17 should be arranged at any position where the left terminal of main body apparatus 2 and the terminal of left controller 3 are in contact with each other while left controller 3 is attached to main body apparatus 2. By way of example, as shown in FIG. 3, left terminal 17 is provided around a lower end portion of left rail member 15.

(3) Member Provided in Right Side Surface of Housing 11

As shown in FIG. 3, a feature similar to the feature provided in the left side surface is provided in a right side surface of housing 11. A right rail member 19 for removably attaching right controller 4 to main body apparatus 2 is provided in the right side surface of housing 11. Right rail member 19 extends along the up-down direction in the right side surface of housing 11. Right rail member 19 is in a shape allowing engagement thereof with a slider (a slider 62 shown in FIG. 5) for right controller 4. A slide mechanism is formed by right rail member 19 and slider 62. With such a slide mechanism, right controller 4 can slidably and removably be attached to main body apparatus 2.

Right rail member 19 is in a shape similar to left rail member 15. Right rail member 19 is in a grooved shape similar in cross-sectional shape to left rail member 15. Right rail member 19 does not have to be exactly the same in shape as left rail member 15. For example, another embodiment may be constructed such that slider 62 for right controller 4 cannot be engaged with left rail member 15 and/or slider 40 for left controller 3 cannot be engaged with right rail member 19 by making a size and/or a shape of the groove different between left rail member 15 and right rail member 19.

A right terminal 21 is provided in the right side surface of housing 11. Right terminal 21 is a terminal for wired communication between main body apparatus 2 and right controller 4. Right terminal 21 is provided at a position where it comes in contact with a terminal (a terminal 64 shown in FIG. 5) of right controller 4 when right controller 4 is attached to main body apparatus 2. Right terminal 21 should be arranged at any position where the right terminal of main body apparatus 2 and the terminal of right controller 4 are in contact with each other while right controller 4 is attached to main body apparatus 2. By way of example, as shown in FIG. 3, right terminal 21 is provided around a lower end portion of right rail member 19.

As described above, housing 11 of main body apparatus 2 according to the present embodiment is provided with left rail member 15 and right rail member 19 for attaching the controllers. A position, a shape, and a size of left rail member 15 and right rail member 19 can arbitrarily be designed. For example, in another embodiment, left rail member 15 and right rail member 19 may be arranged at left and right end portions in a main surface and/or a rear surface of housing 11, respectively. Any feature can be adopted for a mechanism for removably attaching main body apparatus 2 and the controllers to each other, and a slider mechanism different from the slider mechanism shown in FIGS. 1 to 3 may be adopted and a mechanism different from the slider mechanism may be adopted. For example, a construction may be such that a projection provided on a side of the main body apparatus may be fitted and attached to a recess provided on a side of the controller, or a construction may be such that a magnet is provided on the side of the main body apparatus or the side of the controller and a portion made of a magnetic element is provided in the other for attachment of the main body apparatus and the controller to each other by attraction.

(4) Member Provided on Upper Side Surface of Housing 11

As shown in FIG. 3, a first slot 23 for attaching a storage medium of a first type is provided in an upper side surface of housing 11. A lid portion which can be opened and closed is provided in an opening in first slot 23 as a typical feature, and a storage medium of the first type can be inserted in first slot 23 while the lid portion is open. The storage medium of the first type is, for example, a storage medium exclusively designed for game device 1 and a game device of the same type (for example, a dedicated memory card). The storage medium of the first type is used, for example, for storing data used in main body apparatus 2 (for example, data saved for an application) and/or a program executed in main body apparatus 2 (for example, a program for an application).

A power button 28 for switching on and off main body apparatus 2 is provided on the upper side surface of housing 11. In the present embodiment, power button 28 is used also for switching between an ON mode and a sleep mode.

The ON mode refers, for example, to a mode in which representation on a screen of display 12 is provided and the sleep mode refers, for example, to a mode in which representation on the screen of display 12 is not provided. In the sleep mode, representation on the screen of display 12 is not provided, and additionally or instead, processing in an application being executed (for example, game processing in a game application) may be suspended.

When power button 28 is pressed and held (for example, power button 28 is continuously pressed for a prescribed time period or longer), processing for switching on and off main body apparatus 2 is performed. When power button 28 is pressed for a short period of time (for example, power button 28 is pressed for a time period shorter than the prescribed time period above), processing for switching between the ON mode and the sleep mode is performed.

As described above, power button 28 of main body apparatus 2 according to the present embodiment is used for switching on and off and/or switching between the ON mode and the sleep mode. In another embodiment, power button 28 may be used only for any one type of switching. In this case, another button for the other type of switching may be provided in main body apparatus 2.

An audio input and output terminal 25 (specifically an earphone jack) is provided in the upper side surface of housing 11. A microphone or an earphone can be attached to audio input and output terminal 25.

(5) Member Provided on Lower Side Surface of Housing 11

As shown in FIG. 3, a lower terminal 27 for wired communication between main body apparatus 2 and a cradle 5 which will be described later is provided in a lower side surface of housing 11. Lower terminal 27 is provided at a position where it comes in contact with a terminal of cradle 5 when main body apparatus 2 is attached to cradle 5. Typically, a universal serial bus (USB) connector (more specifically, a female connector) can be adopted as lower terminal 27.

A second slot 24 for attaching a storage medium of a second type different from the first type is provided in the lower side surface of housing 11. Second slot 24 may be provided in the surface where first slot 23 is provided. A lid portion which can be opened and closed is provided in an opening in second slot 24 as a typical feature, and a storage medium of the second type can be inserted in second slot 24 while the lid portion is open. The storage medium of the second type may be, for example, a general-purpose storage medium (for example, an SD card). The storage medium of the second type is used, for example, for storing data used in main body apparatus 2 (for example, data saved for an application) and/or a program executed in main body apparatus 2 (for example, a program for an application), similarly to the storage medium of the first type.

A position, a shape, and the number of components (specifically, a button, a slot, and a terminal) provided in housing 11 described above can arbitrarily be designed. For example, in another embodiment, some of power button 28, first slot 23, and second slot 24 may be provided in another side surface or the rear surface of housing 11. Some of the components do not have to be provided.

(a3: Structure of Left Controller)

Figure 4:
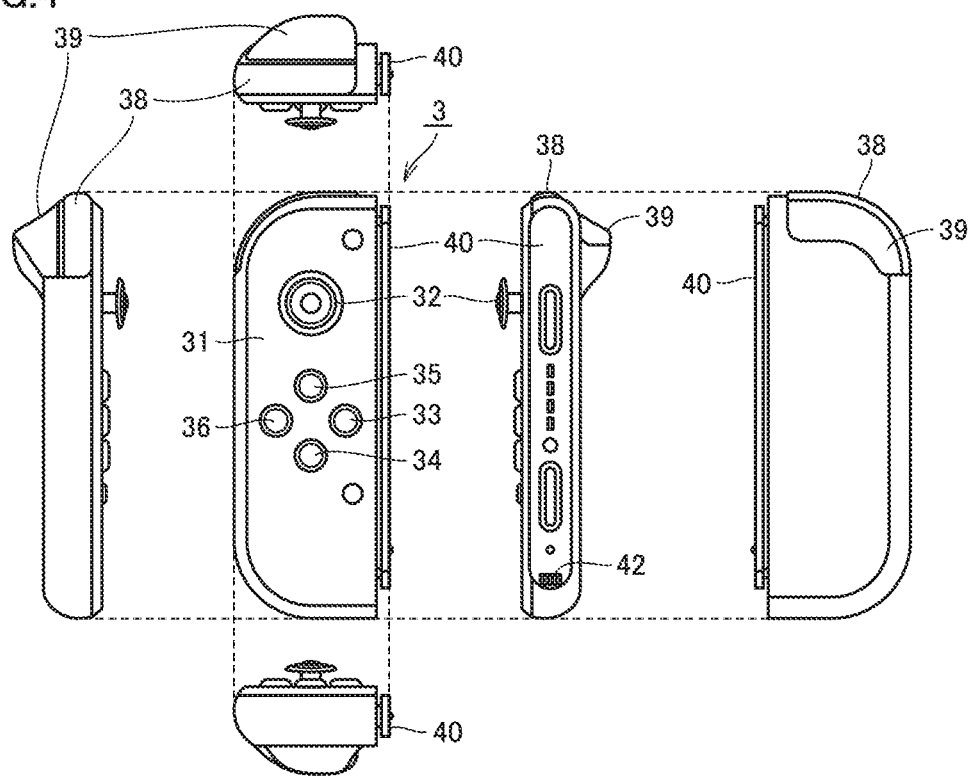
FIG. 4 shows an exemplary illustrative non-limiting diagram illustrating a left controller according to the present embodiment when viewed from six sides.

Referring to the view from six sides of left controller 3 according to the present embodiment shown in FIG. 4, left controller 3 has a housing 31 substantially in a form of a plate. A main surface of housing 31 (that is, a front surface or a surface on a side of a negative direction of the z axis shown in FIG. 1) is substantially in a rectangular shape. Housing 31 is in a vertically long shape, that is, long in the up-down direction (that is, the direction of they axis shown in FIG. 1).

Left controller 3 can be used with its main surface being vertically oriented or with its surface being horizontally oriented when a user holds the left controller while the left controller is detached from main body apparatus 2.

A shape and a size of housing 31 can arbitrarily be designed. In another embodiment, housing 31 may be constructed into a shape other than a shape substantially in a form of a plate. Housing 31 does not have to be rectangular, and for example, a semicircular shape may be adopted. Housing 31 does not have to vertically be long.

A length of housing 31 in the up-down direction is preferably substantially the same as a length in the up-down direction of housing 11 of main body apparatus 2. A thickness of housing 31 (that is, a length in a front-rear direction or a length in the direction of the z axis shown in FIG. 1) is preferably substantially the same as a thickness of housing 11 of main body apparatus 2. Therefore, when left controller 3 is attached to main body apparatus 2 (see FIG. 1), a user can hold main body apparatus 2 and left controller 3 as if they were an integrated apparatus.

A left corner portion of the main surface of housing 31 is rounded more than a right corner portion. A portion of connection between an upper side surface and a left side surface of housing 31 and a portion of connection between a lower side surface and the left side surface of housing 31 are rounded more than a portion of connection between the upper side surface and a right side surface and a portion of connection between the lower side surface and the right side surface (that is, a curve of beveling is great). Therefore, when left controller 3 is attached to main body apparatus 2 (see FIG. 1), the left side of game device 1 is rounded and hence such a shape facilitates holding by a user.

An analog stick 32 is provided in left controller 3. As shown in FIG. 4, analog stick 32 is provided on the main surface of housing 31. Analog stick 32 represents one example of a direction instruction portion with which a direction can be input. Analog stick 32 includes a stick member which can be tilted in all directions (that is, a 360° direction including up, down, left, right, and diagonal directions) in parallel to the main surface of housing 31. Analog stick 32 is an analog input device with which a user can input a direction in accordance with a direction of tilt by titling the stick member. Analog stick 32 may further be constructed to be able to give an input of magnitude in accordance with an angle of tilt in addition to input of a direction in accordance with a direction of tilt when the stick member is tilted. Alternatively, a slide stick may implement the direction instruction portion. The slide stick is an input portion having a stick member slidable in all directions in parallel to the main surface of housing 31, and the user can give an input in accordance with a direction of slide by sliding the stick member. The slide stick may further be constructed also to give an input of magnitude in accordance with an amount of slide. Alternatively, the direction instruction portion may be implemented as an input portion indicating a direction through an operation input to press a button. For example, the direction instruction portion may be implemented as an input portion indicating a direction with a cross-shaped key or four buttons corresponding to up, down, left, and right directions, respectively. In the present embodiment, an input can be given by pressing the stick member (in the direction perpendicular to housing 31). Analog stick 32 in the present embodiment is an input portion with which an input of a direction and magnitude in accordance with a direction of tilt and an amount of tilt of the stick member can be given and an input resulting from pressing of the stick member can be given.

Left controller 3 includes four operation buttons 33 to 36 (specifically, a right direction button 33, a down direction button 34, an up direction button 35, and a left direction button 36). As shown in FIG. 4, these four buttons 33 to 36 are provided under analog stick 32 on the main surface of housing 31. Though four operation buttons are provided on the main surface of left controller 3 in the present embodiment, any number of operation buttons may be provided. These operation buttons 33 to 36 are used for giving an instruction in accordance with various programs (for example, an OS program or an application program) executed in main body apparatus 2. Since operation buttons 33 to 36 may be used for giving an input of a direction in the present embodiment, operation buttons 33 to 36 are also referred to as right direction button 33, down direction button 34, up direction button 35, and left direction button 36 for the sake of convenience of description. Operation buttons 33 to 36 may be used for giving an instruction other than an input of a direction.

Figure 9:
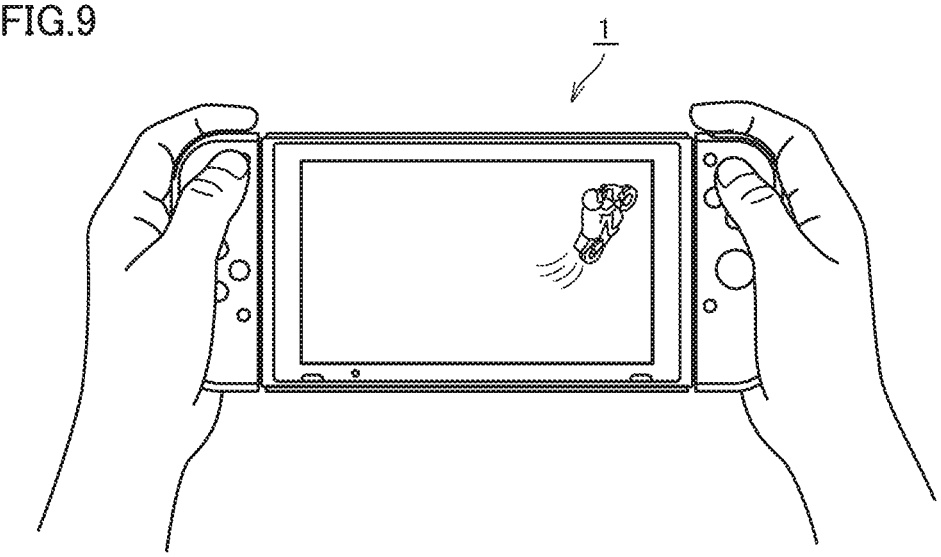
FIG. 9 shows an exemplary illustrative non-limiting diagram illustrating one example of a manner of use of the game device with the left controller and the right controller being attached to the main body apparatus (an attached state).

An operation portion (specifically, analog stick 32 and operation buttons 33 to 36) provided on the main surface of left controller 3 is operated, for example, with the left thumb of a user who holds game device 1 when left controller 3 is attached to main body apparatus 2 (see FIG. 9). When left controller 3 is used as being detached from main body apparatus 2, the operation portion is operated, for example, with the left thumb of the user who holds left controller 3 (see FIG. 10).

A first L button 38 and a ZL button 39 are provided in left controller 3. These operation buttons 38 and 39 are used for giving an instruction in accordance with various programs executed in main body apparatus 2, similarly to operation buttons 33 to 36 described above. As shown in FIG. 4, first L button 38 is provided in an upper left portion on the side surface of housing 31. ZL button 39 is provided in an upper left portion as extending from the side surface to the rear surface of housing 31 (strictly speaking, the upper left portion when housing 31 is viewed from the front). ZL button 39 is provided in the rear of first L button 38 (a side of a positive direction of the z axis shown in FIG. 1). Since the upper left portion of housing 31 is rounded in the present embodiment, first L button 38 and ZL button 39 are in a rounded shape in conformity with rounding of the upper left portion of housing 31.

When left controller 3 is attached to main body apparatus 2, first L button 38 and ZL button 39 are arranged in the upper left portion of game device 1 (see FIG. 1). Therefore, a user who holds game device 1 can operate first L button 38 and ZL button 39 with his/her left forefinger or long finger.

Left controller 3 has slider 40 described above. As shown in FIG. 4, slider 40 extends along the up-down direction in the right side surface of housing 31. Slider 40 is in a shape allowing engagement with left rail member 15 (more specifically, a groove in left rail member 15) of main body apparatus 2. Specifically, slider 40 has a projecting cross-section (specifically, a cross-section perpendicular to the up-down direction). More specifically, slider 40 has a cross-section in a T shape in conformity with a shape of a cross-section of left rail member 15. Therefore, slider 40 engaged with left rail member 15 is fixed and does not come off in a direction perpendicular to a direction of slide (that is, a direction of extension of left rail member 15).

(a4: Structure of Right Controller)

Figure 5:
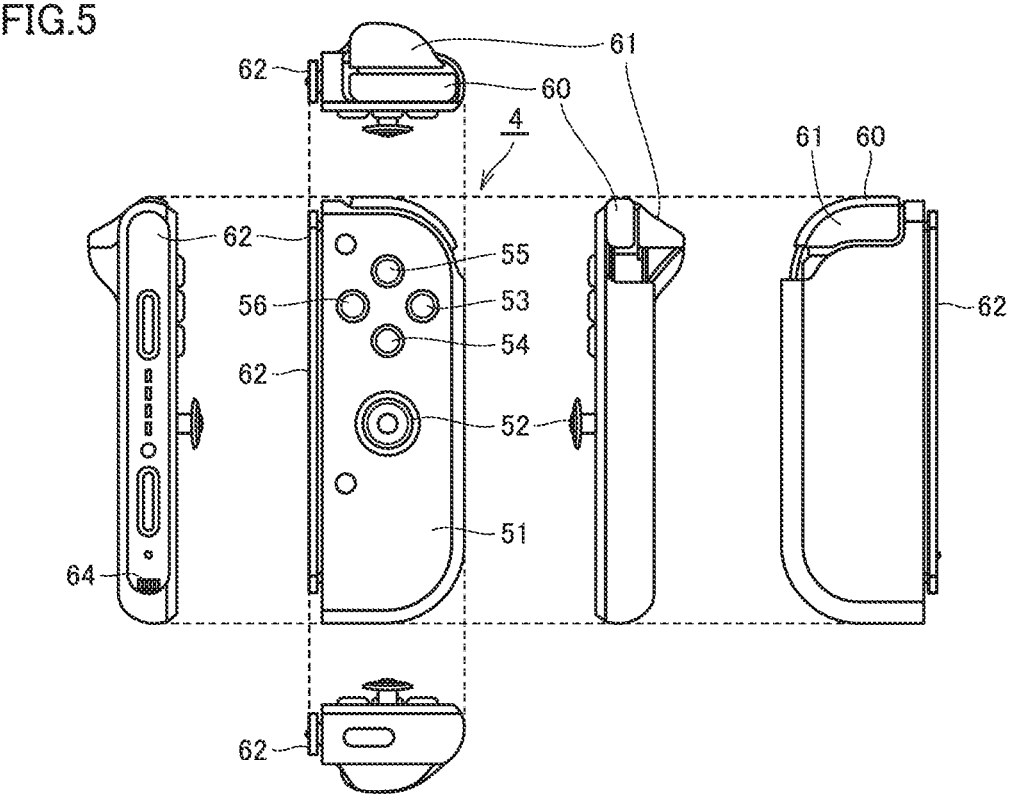
FIG. 5 shows an exemplary illustrative non-limiting diagram illustrating a right controller according to the present embodiment when viewed from six sides.

Referring to the view from six sides of right controller 4 according to the present embodiment shown in FIG. 5, right controller 4 has a housing 51 substantially in a form of a plate. A main surface of housing 51 (that is, a front surface or a surface on the side of the negative direction of the z axis shown in FIG. 1) is substantially in a rectangular shape. Housing 51 is in a vertically long shape, that is, long in the up-down direction.

Right controller 4 can be used with its main surface being vertically oriented or with its surface being horizontally oriented when a user holds the right controller while the right controller is detached from main body apparatus 2.

Similarly to housing 31 of left controller 3, a length of housing 51 of right controller 4 in the up-down direction is preferably substantially the same as the length in the up-down direction of housing 11 of main body apparatus 2 and a thickness thereof is preferably substantially the same as the thickness of housing 11 of main body apparatus 2. Therefore, when right controller 4 is attached to main body apparatus 2 (see FIG. 1), a user can hold main body apparatus 2 and right controller 4 as if they were an integrated apparatus.

A right corner portion of the main surface of housing 51 is rounded more than a left corner portion. A portion of connection between an upper side surface and a right side surface of housing 51 and a portion of connection between a lower side surface and the right side surface of housing 51 are rounded more than a portion of connection between the upper side surface and a left side surface and a portion of connection between the lower side surface and the left side surface (that is, a curve of beveling is great). Therefore, when right controller 4 is attached to main body apparatus 2 (see FIG. 1), the right side of game device 1 is rounded and hence such a shape facilitates holding by a user.

An analog stick 52 is provided in right controller 4 as a direction instruction portion as in left controller 3. Analog stick 52 is constructed substantially similarly to analog stick 32 in left controller 3. Right controller 4 includes four operation buttons 53 to 56 (specifically, an A button 53, a B button 54, an X button 55, and a Y button 56) similarly to left controller 3. These four operation buttons 53 to 56 are substantially the same in mechanism as four operation buttons 33 to 36 in left controller 3. As shown in FIG. 5, analog stick 52 and operation buttons 53 to 56 are provided on the main surface of housing 51. Though four operation buttons are provided on the main surface of right controller 4 in the present embodiment, any number of operation buttons may be provided.

Positional relation between two types of operation portions (analog stick 52 and the operation buttons) in right controller 4 is opposite to positional relation of these two types of operation portions in left controller 3. In right controller 4, analog stick 52 is arranged under operation buttons 53 to 56, whereas in left controller 3, analog stick 32 is arranged above operation buttons 33 to 36. With such arrangement, when two controllers are used as being detached from main body apparatus 2, both of the controllers can be used with similar operational feeling.

When right controller 4 is attached to main body apparatus 2, the operation portion (specifically analog stick 52 and operation buttons 53 to 56) provided on the main surface of right controller 4 is operated, for example, with the right thumb of a user who holds game device 1 (see FIG. 9). When right controller 4 is used as being detached from main body apparatus 2, the operation portion is operated, for example, with the right thumb of a user who holds right controller 4.

A first R button 60 and a ZR button 61 are provided in right controller 4. As shown in FIG. 5, first R button 60 is provided in an upper right portion on the side surface of housing 51. ZR button 61 is provided in an upper right portion as extending from the side surface to the rear surface of housing 51 (strictly speaking, the upper right portion when housing 51 is viewed from the front). ZR button 61 is provided in the rear of first R button 60 (the side of the positive direction of the z axis shown in FIG. 1). Since the upper right portion of housing 51 is rounded in the present embodiment, first R button 60 and ZR button 61 are in a rounded shape in conformity with rounding of the upper right portion of housing 51.

When right controller 4 is attached to main body apparatus 2, first R button 60 and ZR button 61 are arranged in the upper right portion of game device 1 (see FIG. 1). Therefore, a user who holds game device 1 can operate first R button 60 and ZR button 61 with his/her right forefinger or long finger.

In the present embodiment, first L button 38 and first R button 60 are not symmetric to each other in shape, and ZL button 39 and ZR button 61 are not symmetric to each other in shape. In another embodiment, first L button 38 and first R button 60 may be symmetric to each other in shape, and ZL button 39 and ZR button 61 may be symmetric to each other in shape.

Right controller 4 has terminal 64 for wired communication between right controller 4 and main body apparatus 2. Terminal 64 is provided at a position where it comes in contact with right terminal 21 (FIG. 3) of main body apparatus 2 when right controller 4 is attached to main body apparatus 2. Terminal 64 should be arranged at any position where main body apparatus 2 and right controller 4 are in contact with each other while right controller 4 is attached to main body apparatus 2. By way of example, as shown in FIG. 5, terminal 64 is provided around a lower end portion of a surface where slider 62 is attached.

A position, a shape, and the number of components (specifically, a slider, a stick, a button, and an LED) provided in housing 31 of left controller 3 and/or housing 51 of right controller 4 can arbitrarily be designed. For example, in another embodiment, the controller may include a direction instruction portion of a type different from the analog stick. Slider 40 or 62 may be arranged at a position in accordance with a position of left rail member 15 and right rail member 19 provided in main body apparatus 2, and for example, may be arranged in the main surface or the rear surface of housing 31 or 51. Some of the components do not have to be provided.

(a5: Use of Cradle)

Figure 6:
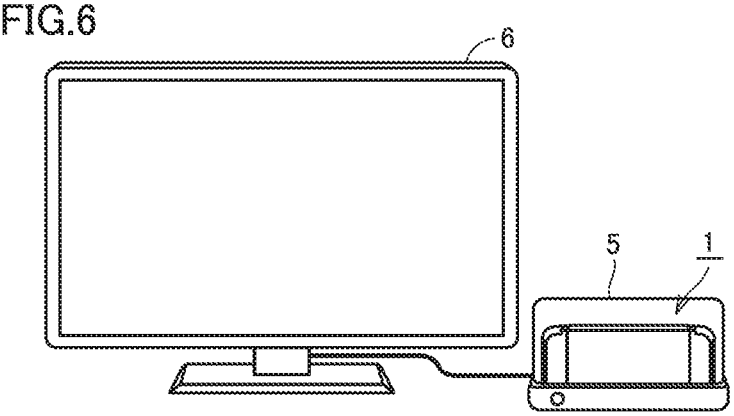
FIG. 6 shows an exemplary illustrative non-limiting schematic diagram illustrating appearance when the game device according to the present embodiment is used together with a cradle.

Use of game device 1 according to the present embodiment together with a cradle will be described with reference to FIG. 6. The game system shown in FIG. 6 includes game device 1 and cradle 5.

Cradle 5 is constructed to be able to carry game device 1 and constructed to be able to communicate with a television 6 representing one example of an external display apparatus separate from display 12 of game device 1. When game device 1 is carried on cradle 5, an image obtained or generated by game device 1 can be shown on television 6. Communication between cradle 5 and television 6 may be wired communication or wireless communication.

Cradle 5 may have a function to charge placed game device 1 and a function as a communication hub apparatus (for example, a USB hub).

[B. Internal Configuration of Each Apparatus]

An internal configuration of each apparatus associated with the game system according to the present embodiment will initially be described.

(b1: Internal Configuration of Main Body Apparatus)

Figure 7:
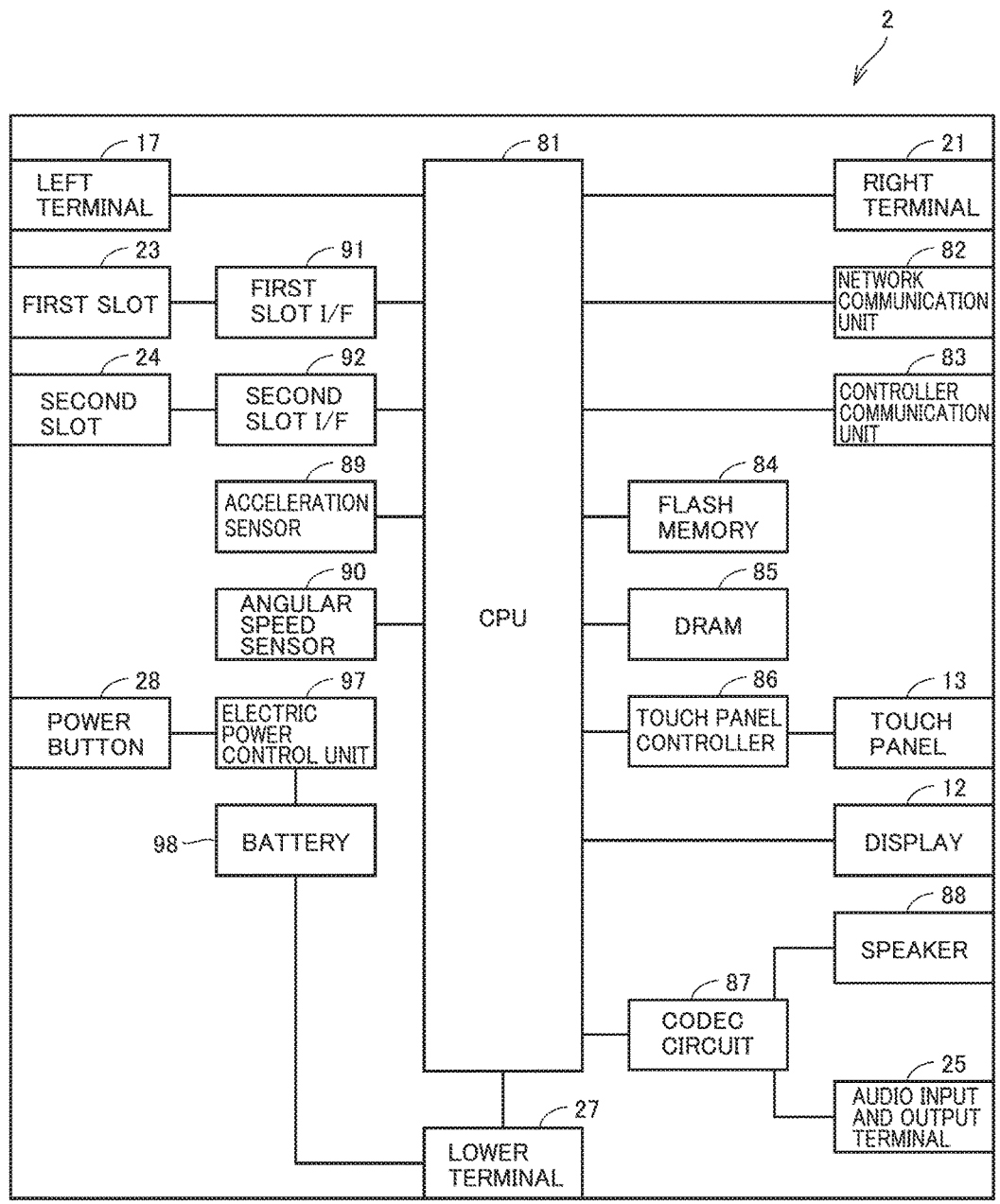
FIG. 7 shows an exemplary illustrative non-limiting block diagram illustrating an internal configuration of the main body apparatus according to the present embodiment.

One example of an internal configuration of main body apparatus 2 according to the present embodiment will be described with reference to FIG. 7. Main body apparatus 2 includes components shown in FIG. 7. The components shown in FIG. 7 are accommodated in housing 11, for example, as being mounted on an electronic circuit substrate as electronic components.

Main body apparatus 2 includes a central processing unit (CPU) 81 corresponding to an information processing unit (or a processor) performing various types of processing including game processing. CPU 81 reads and executes a program stored in an accessible storage unit (specifically, an internal storage medium such as a flash memory 84 or an external storage medium attached to first slot 23 or second slot 24).

Main body apparatus 2 includes flash memory 84 and a dynamic random access memory (DRAM) 85 by way of example of an embedded internal storage medium. Flash memory 84 is a non-volatile memory mainly storing various types of data (which may be a program) saved in main body apparatus 2. DRAM 85 is a volatile memory temporarily storing various types of data used in information processing.

Main body apparatus 2 includes a first slot interface (I/F) 91 and a second slot interface 92. The first slot interface is connected to first slot 23 and reads and writes data from and into a storage medium of the first type (for example, an SD card) attached to first slot 23, in response to an instruction from CPU 81. Second slot interface 92 is connected to second slot 24 and reads and writes data from and into a storage medium of the second type (for example, a dedicated memory card) attached to second slot 24, in response to an instruction from CPU 81.

Main body apparatus 2 includes a network communication unit 82 for communication (specifically, wireless communication) with an external apparatus through a network. For example, a communication module authorized for Wi-Fi is employed for network communication unit 82 and network communication unit 82 communicates with an external apparatus through wireless LAN. In another embodiment, main body apparatus 2 may have a function for connection and communication with a mobile communication network (that is, a portable telephone communication network) in addition to (or instead of) a function for connection and communication with wireless LAN.

Main body apparatus 2 includes a controller communication unit 83 for wireless communication with left controller 3 and/or right controller 4. Though any scheme is applicable for communication between main body apparatus 2 and each controller, for example, a communication scheme under the Bluetooth® specifications can be adopted.

CPU 81 is connected to left terminal 17, right terminal 21, and lower terminal 27. CPU 81 transmits and receives data to and from left controller 3 through left terminal 17 when wired communication with left controller 3 is established. CPU 81 transmits and receives data to and from right controller 4 through right terminal 21 when wired communication with right controller 4 is established. Data transmitted from CPU 81 to left controller 3 or right controller 4 is, for example, data for controlling a vibration generation portion of left controller 3 or right controller 4. Data received by CPU 81 from left controller 3 or right controller 4 is, for example, operation data output in response to an operation input by a user of the operation portion in left controller 3 or right controller 4. CPU 81 transmits data to cradle 5 through lower terminal 27 when it communicates with cradle 5.

In the present embodiment, main body apparatus 2 can establish both of wired communication and wireless communication with left controller 3 and right controller 4.

Main body apparatus 2 includes a touch panel controller 86 for control of touch panel 13. Touch panel controller 86 generates data indicating a position of a touch input in response to a signal from touch panel 13, and outputs the data to CPU 81.

Display 12 shows an image generated by execution of various types of processing by CPU 81 and/or an image obtained from the outside.

Main body apparatus 2 includes a codec circuit 87 and speaker 88 (specifically, the left speaker and the right speaker). Codec circuit 87 controls input and output of audio data to and from speaker 88 and audio input and output terminal 25. More specifically, when codec circuit 87 receives audio data from CPU 81, it outputs an audio signal resulting from D/A conversion of the audio data to speaker 88 or audio input and output terminal 25. Thus, sound is output from speaker 88 or an audio output portion (for example, an earphone) connected to audio input and output terminal 25. When codec circuit 87 receives an audio signal from audio input and output terminal 25, it subjects the audio signal to A/D conversion and outputs audio data in a prescribed format to CPU 81.

Main body apparatus 2 has an acceleration sensor 89 and an angular speed sensor 90. Acceleration sensor 89 detects magnitude of a linear acceleration along directions of prescribed three axes (for example, the xyz axes shown in FIG. 1). Acceleration sensor 89 may detect an acceleration in a direction of one axis or accelerations in directions of two axes. Angular speed sensor 90 detects angular speeds around prescribed three axes (for example, the xyz axes shown in FIG. 1). Angular speed sensor 90 may detect an angular speed around one axis or angular speeds around two axes. A result of detection by acceleration sensor 89 and angular speed sensor 90 is output to CPU 81. CPU 81 can calculate information on a motion and/or an attitude of main body apparatus 2 based on the result of detection by acceleration sensor 89 and angular speed sensor 90.

Main body apparatus 2 includes an electric power control unit 97 and a battery 98. Electric power control unit 97 controls supply of electric power from battery 98 to each component based on a command from CPU 81. Electric power control unit 97 controls supply of electric power in accordance with an input onto power button 28. When an operation input to turn off power supply is performed on power button 28, electric power control unit 97 stops supply of electric power totally or in part, and when an operation input to turn on power supply is performed on power button 28, it starts full supply of electric power. When an instruction to switch to the sleep mode is given to power button 28, electric power control unit 97 stops supply of electric power to some components including display 12, and when an instruction to switch to the ON mode is given to power button 28, it starts supply of electric power.

When an external charging apparatus (for example, cradle 5) is connected to lower terminal 27 and electric power is supplied to main body apparatus 2 through lower terminal 27, battery 98 is charged with supplied electric power.

Battery 98 of main body apparatus 2 is preferably higher in charging capacity than a battery of left controller 3 and right controller 4.

(b2: Internal Configuration of Controller)

Figure 8:
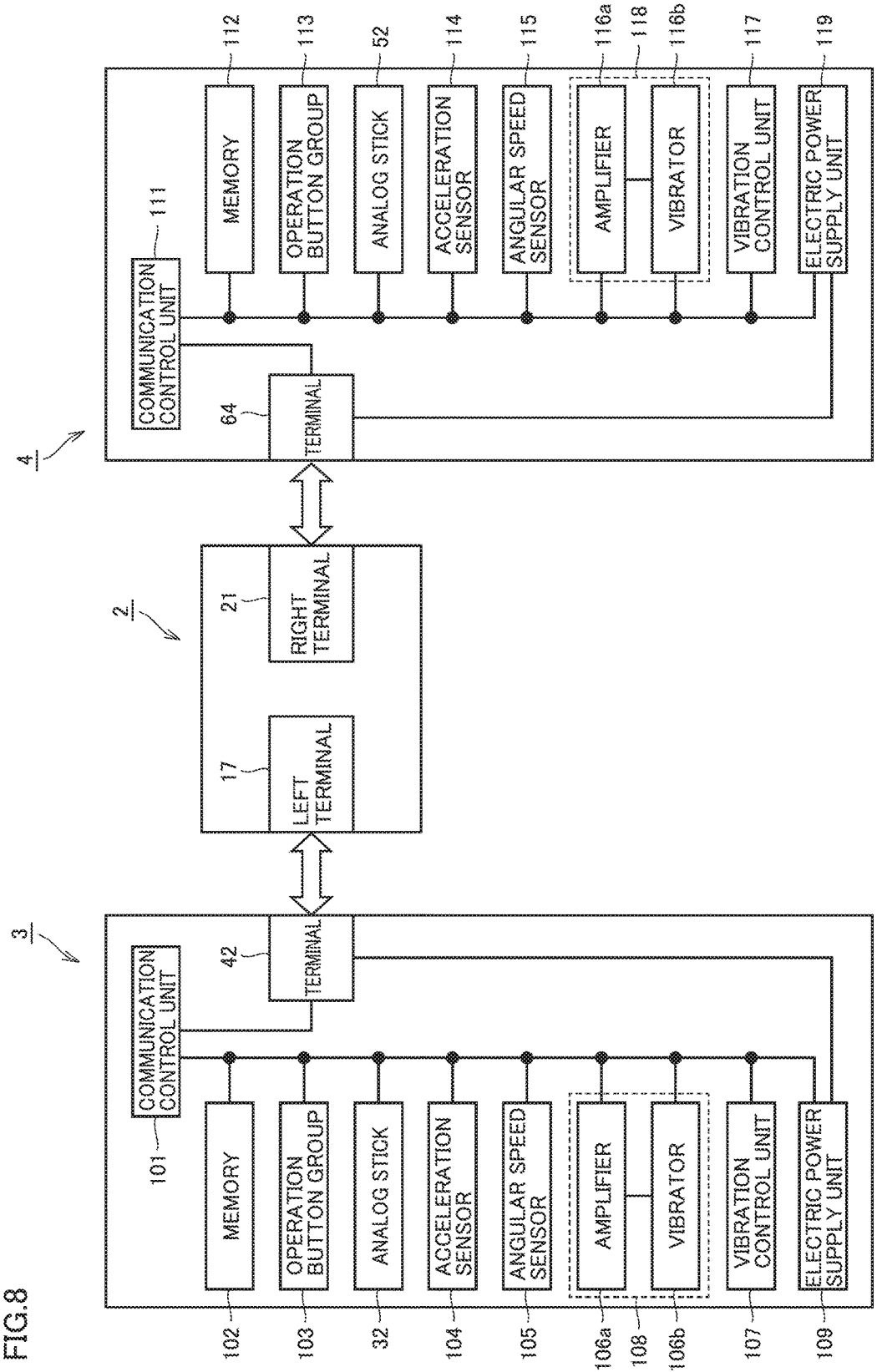
FIG. 8 shows an exemplary illustrative non-limiting block diagram illustrating an internal configuration of the left controller and the right controller according to the present embodiment.

One example of an internal configuration of left controller 3 and right controller 4 according to the present embodiment will be described with reference to FIG. 8. FIG. 8 also depicts components of main body apparatus 2 associated with left controller 3 and right controller 4.

Left controller 3 includes a communication control unit 101 for communication with main body apparatus 2. Communication control unit 101 can communicate with main body apparatus 2 through both of wired communication through terminal 42 and wireless communication not through terminal 42. Communication control unit 101 selects wired communication or wireless communication depending on whether or not left controller 3 is attached to main body apparatus 2, and establishes communication under a selected communication method. While left controller 3 is attached to main body apparatus 2, communication control unit 101 establishes communication with main body apparatus 2 through terminal 42. While left controller 3 is detached from main body apparatus 2, communication control unit 101 establishes wireless communication with main body apparatus 2 (specifically, controller communication unit 83). The communication control unit should only be able to establish communication with the main body apparatus, and for example, it may be configured to establish only either wired communication or wireless communication.

Left controller 3 includes, for example, a memory 102 such as a flash memory. Communication control unit 101 is implemented, for example, by a microprocessor and performs various types of processing by executing firmware stored in memory 102.

Left controller 3 includes an operation button group 103 (specifically operation buttons 33 to 36, 38, and 39) and analog stick 32. Information on an operation input onto operation button group 103 and analog stick 32 is repeatedly output to communication control unit 101 with a prescribed period.

Left controller 3 has an acceleration sensor 104 and an angular speed sensor 105. Acceleration sensor 104 detects magnitude of a linear acceleration along directions of prescribed three axes (for example, the xyz axes shown in FIG. 1). Acceleration sensor 104 may detect an acceleration in a direction of one axis or accelerations in directions of two axes. Angular speed sensor 105 detects angular speeds around prescribed three axes (for example, the xyz axes shown in FIG. 1). Angular speed sensor 105 may detect an angular speed around one axis or angular speeds around two axes. A result of detection by acceleration sensor 104 and angular speed sensor 105 is repeatedly output to communication control unit 101 with a prescribed period.

Communication control unit 101 obtains information on an input from each of operation button group 103, analog stick 32, acceleration sensor 104, and angular speed sensor 105 (for example, information on an operation input by a user or a result of detection by the sensor). Communication control unit 101 transmits data including obtained information (or information obtained by subjecting obtained information to prescribed processing) to main body apparatus 2. Data is transmitted to main body apparatus 2 repeatedly with a prescribed period. A period of transmission of information on an input to main body apparatus 2 may or may not be identical among input devices.

Main body apparatus 2 can know an input given to left controller 3 based on transmitted data. More specifically, main body apparatus 2 can discriminate an operation input onto operation button group 103 and analog stick 32. Main body apparatus 2 can calculate information on a motion and/or an attitude of left controller 3.

In the present embodiment, each of left controller 3 and right controller 4 has a vibration portion. The "vibration portion" herein means a portion which vibrates. A feature for vibrating the vibration portion (a vibration generation portion which will be described later) may be arranged in the vibration portion or at a location different from the vibration portion.

Left controller 3 has a vibration generation portion 108 which generates vibration for vibrating the vibration portion and a vibration control unit 107 which controls vibration generation portion 108. Vibration generation portion 108 is implemented, for example, by a vibration motor, and in the present example, it is constituted of an amplifier 106a and a vibrator 106b. Vibrator 106b is controlled by vibration control unit 107 in accordance with a vibration control signal from main body apparatus 2. When vibration control unit 107 receives a vibration control signal from main body apparatus 2 through communication control unit 101, it outputs a control signal in accordance with the vibration control signal to amplifier 106a. Amplifier 106a amplifies the control signal from vibration control unit 107, generates a drive signal for vibrating vibrator 106b, and provides the drive signal to vibrator 106b. Vibrator 106b thus operates in accordance with the vibration control signal from main body apparatus 2.

Vibrator 106b is arranged at a position causing a user to feel vibration owing to an operation of vibrator 106b when the user holds left controller 3. The vibration portion arranged in a portion held with the left hand (one hand) of the user is configured to vibrate owing to vibrator 106b. The portion held with the left hand (one hand) of the user is a region where a left finger or palm of the user is in contact when the user grips left controller 3 for playing a game, and specifically, for example, it is preferably in the vicinity of a position where operation buttons 33 to 36 of housing 31 of left controller 3 are arranged. Alternatively, when a grip or the like is provided in the controller for facilitating holding by the user, the vibrator may be arranged in the grip such that the grip vibrates as the vibration portion.

Left controller 3 includes an electric power supply unit 109 including a battery and an electric power control circuit. Electric power supply unit 109 controls supply of electric power to each component of left controller 3. When left controller 3 is attached to main body apparatus 2, the battery is charged by power feed from main body apparatus 2 through terminal 42.

Right controller 4 is configured basically similarly to left controller 3 described above. Right controller 4 includes a communication control unit 111, an operation button group 113 (specifically operation buttons 53 to 56, 60, and 61), analog stick 52, an acceleration sensor 114, an angular speed sensor 115, a vibration generation portion 118 (an amplifier 116a and a vibrator 116b), a vibration control unit 117, and an electric power supply unit 119.

Right controller 4 has vibration generation portion 118 for giving a notification to a user through vibration similarly to left controller 3. Vibrator 116b of vibration generation portion 118 is controlled by vibration control unit 117 in accordance with a vibration control signal from main body apparatus 2. When vibration control unit 117 receives a vibration control signal from main body apparatus 2 through communication control unit 111, it outputs a control signal in accordance with the vibration control signal to amplifier 116a. Amplifier 116a amplifies the control signal from vibration control unit 117, generates a drive signal for vibrating vibrator 116b, and provides the drive signal to vibrator 116b. Vibrator 116b thus operates in accordance with the vibration control signal from main body apparatus 2.

Vibrator 116b is arranged at a position causing a user to feel vibration owing to an operation of vibrator 116b when the user holds right controller 4. The vibration portion arranged in a portion held with the right hand (the other hand) of the user is configured to vibrate owing to vibrator 116b. The portion held with the right hand (the other hand) of the user is a region where a right finger or palm of the user is in contact when the user grips right controller 4 for playing a game, and specifically, for example, it is preferably in the vicinity of a position where operation buttons 53 to 56 of housing 51 of right controller 4 are arranged. Alternatively, when a grip or the like is provided in the controller for facilitating holding by the user, the vibrator may be arranged in the grip such that the grip vibrates as the vibration portion.

Since other components of right controller 4 have features and functions the same as those of corresponding components described in connection with left controller 3, detailed description will not be repeated.

Thus, game device 1 according to the present embodiment includes left controller 3 held with the left hand of the user (one hand) (a portion held with the left hand of the user) and right controller 4 held with the right hand (the other hand) of the user (a portion held with the right hand of the user). Vibration generation portion 108 is arranged in left controller 3 and vibration generation portion 118 is arranged in right controller 4.

The "operation portion" herein may mean a function or a feature accepting an operation input by a user and encompass any component such as a button, an analog stick, and various sensors arranged in main body apparatus 2, left controller 3, and right controller 4, so long as it can sense an operation performed by a user. The operation portion may be configured to be able to sense an operation input by the user based on combination of a button, an analog stick, and various sensors as being distributed in main body apparatus 2, left controller 3, and right controller 4.

In another embodiment, a vibration portion may be arranged in each of a portion held with the left hand of a user and a portion held with the right hand of the user in an integrated controller as disclosed in Japanese Patent Laying-Open No. 2013-236909.

[C. Manner of Use of Game System]

As described above, game device 1 according to the present embodiment is constructed such that left controller 3 and right controller 4 are removable. Game device 1 can output an image and sound to television 6 by being attached to cradle 5. Therefore, game device 1 can be used in various manners of use as will be described below. A main manner of use of game device 1 will be exemplified below.

(c1: Manner of Use with Controller being Attached to Main Body Apparatus)

One example of a manner of use of game device 1 with left controller 3 and right controller 4 being attached to main body apparatus 2 (hereinafter also referred to as an "attached state") will be described with reference to FIG. 9. As shown in FIG. 9, in the attached state, game device 1 can be used as a portable device.

In the attached state, basically, communication between main body apparatus 2, and left controller 3 and right controller 4 is established through wired communication. In another embodiment, communication between main body apparatus 2, and left controller 3 and right controller 4 may be established through wireless communication also in the attached state.

In the attached state, four operation buttons 33 to 36 of left controller 3 may be used for inputting a direction (that is, an instruction for a direction). A user can input a direction with analog stick 32 or operation buttons 33 to 36. Since the user can input a direction with his/her preferred operation means, operability can be improved. For which instruction operation buttons 33 to 36 are used may arbitrarily be determined depending on a program executed in main body apparatus 2.

In the present embodiment, arrangement of the analog stick and four operation buttons (that is, A, B, X, and Y buttons) is reverse between left controller 3 and right controller 4. In the attached state, analog stick 32 is arranged above four operation buttons 33 to 36 in left controller 3, whereas four operation buttons 53 to 56 are arranged above analog stick 52 in right controller 4. Therefore, when a user holds game device 1 with his/her both hands being located at the same height (that is, at positions the same in the up-down direction) as shown in FIG. 9, the analog stick is located at a position where it is readily operable with one hand and the four operation buttons are located at positions where they are readily operable with the other hand. Game device 1 according to the present embodiment thus provides a feature facilitating an operation of the analog stick and the four operation buttons.

(c2: Manner of Use with One Set of Controllers being Detached from Main Body Apparatus)

Figure 10:
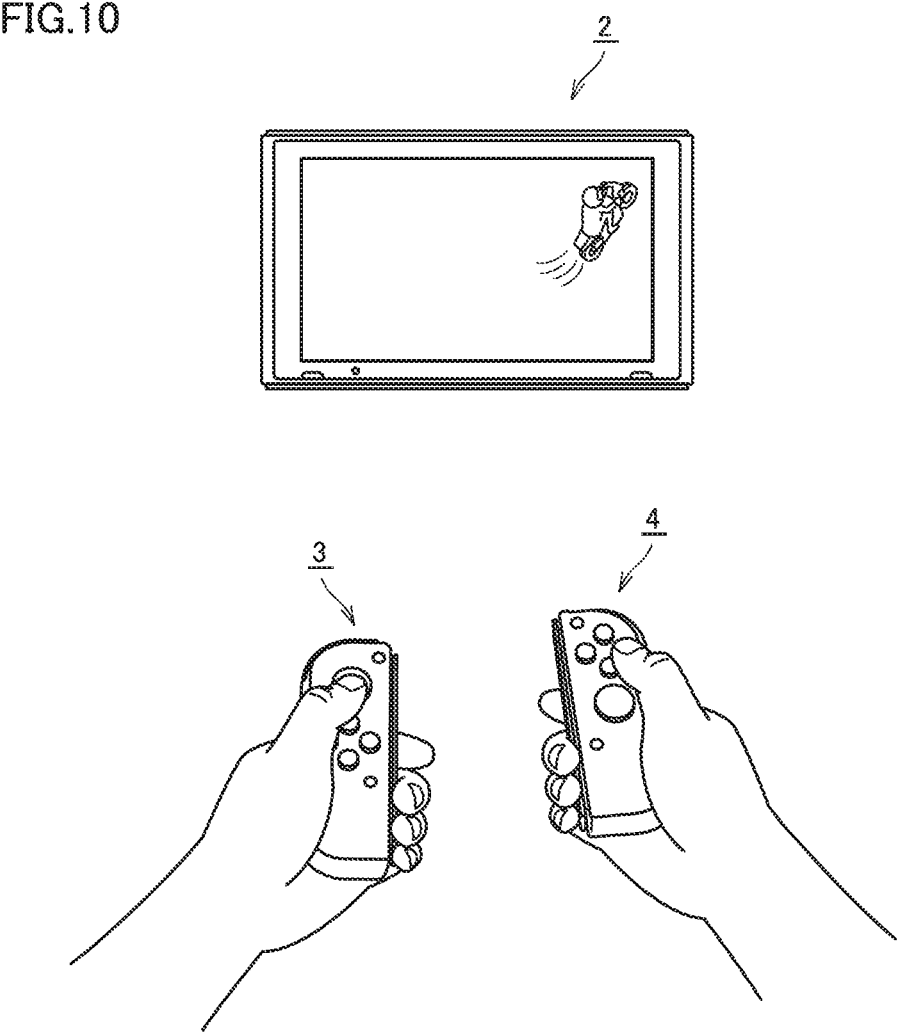
FIG. 10 shows an exemplary illustrative non-limiting diagram illustrating one example of a manner of use of the game device with the left controller and the right controller being detached from the main body apparatus (a detached state).

One example of a manner of use of game device 1 with left controller 3 and right controller 4 being detached from main body apparatus 2 (hereinafter also referred to as a "detached state") will be described with reference to FIG. 10. As shown in FIG. 10, in the detached state, the user can operate left controller 3 and right controller 4 in his/her left and right hands, respectively.

In the detached state, basically, communication between main body apparatus 2, and left controller 3 and right controller 4 is established through wireless communication. Main body apparatus 2 receives data from the controller with which it has established wireless communication (typically, pairing has been done) and performs game processing based on the received data.

Though FIG. 10 shows a manner of use by one user of one set of controllers (the left controller and the right controller), such a manner of use that two users use the respective controllers is also applicable. In this case, two users can simultaneously participate in a game with one set of controllers (the left controller and the right controller).

Though FIG. 10 shows a state that both of left controller 3 and right controller 4 are detached from main body apparatus 2, limitation thereto is not intended and game device 1 can also be used with any one of left controller 3 and right controller 4 being detached from main body apparatus 2 and the other being attached to main body apparatus 2.

(c3: Manner of Use of Television)

One example of a manner of use of game device 1 with main body apparatus 2 being attached to cradle 5 will be described with reference to FIG. 11. As shown in FIG. 11, by attaching main body apparatus 2 to cradle 5, an image obtained or generated by game device 1 can be shown on television 6. A user operates left controller 3 and/or right controller 4 while the user watches an image shown on television 6 (and an image shown on the display of main body apparatus 2 as necessary).

(c4: Manner of Use of Three or More Controllers)

Main body apparatus 2 according to the present embodiment can communicate with a plurality of left controllers and a plurality of right controllers. Therefore, three or more controllers can simultaneously be used for main body apparatus 2. In this case, each user may use one controller or each user may use two controllers.

Furthermore, one user may use a set of controllers consisting of left and right controllers and another user may use only one controller. Alternatively, one user may use a controller attached to main body apparatus 2 and another user may use a controller detached from main body apparatus 2.

When three or more controllers can thus be used, they can be used in various manners.

(c5: Other Manners)

In addition to the manners of use as described above, a head mounted display (HMD) type display can also be used.

(c6: Advantages in Terms of Operation)

In the present embodiment, information on a motion and/or an attitude of each controller can be calculated based on a result of detection by the acceleration sensor and/or the angular speed sensor in the left controller and the right controller. Game device 1 can accept an operation input by a user to move the controller itself as an input. The user can perform not only an operation input onto the operation portion (the operation buttons and the analog stick) in each controller but also an operation input to move the controller itself. In the present embodiment, game device 1 can provide a user with an operation input to move a controller (without moving a display) while it is a portable device. Game device 1 can also provide a game device allowing a user to perform an operation input at a location distant from display 12 while it is a portable device.

Game device 1 can calculate information on a motion and/or an attitude of game device 1 based on a result of detection by the acceleration sensor and/or the angular speed sensor in the left controller and the right controller not only in the detached state but also in the attached state. Game device 1 can also calculate information on a motion and/or an attitude of game device 1 based on a result of detection by acceleration sensor 89 and/or angular speed sensor 90 in main body apparatus 2 in the attached state.

[D. Overview of Game Processing]

Overview of game processing performed in the game system according to the present embodiment will now be described. The game processing according to the present embodiment makes use of vibration generation portion 108 (see FIG. 8) in left controller 3 and vibration generation portion 118 (see FIG. 8) in right controller 4.

As described with reference to FIGS. 4, 5, and 8, left controller 3 has the vibration portion arranged in the portion held with one hand (that is, the left hand) of a user (corresponding to an area where vibration from vibration generation portion 108 can be transmitted to the user) and right controller 4 has the vibration portion arranged in the portion held with the other hand (that is, the right hand) of the user (corresponding to an area where vibration from vibration generation portion 118 can be transmitted to the user). A set of these controllers corresponds to the operation portion.

By adopting such an operation portion which can provide vibration to each hand of the user, vibration in accordance with a behavior of an object shown in the virtual space can be provided to the user. The user can obtain an experience closer to the real by feeling vibration in accordance with progress of the game processing.

One example of game processing performed by the game system according to the present embodiment will be described with reference to FIGS. 12A, 12B, 13A, and 13B. The game processing according to the present embodiment provides a screen representation of an object in a virtual space 300 and a screen representation of movement of the shown object. Typically, game processing for a user to control movement of a user character which rides on such a vehicle as a motor bicycle is assumed.

Limitation to the game processing as shown in FIGS. 12A, 12B, 13A, and 13B, however, is not intended, and for example, game processing in which a form of ride and movement on a bicycle, a car, or a moving element similar thereto which moves over the ground, any user character on an aircraft, a rocket, or a moving element similar thereto which moves in the air, a ship, a boat, or a moving element similar thereto which moves over the water, or a submarine, underwater life (for example, a dolphin), or a moving element similar thereto which moves in the water appears may be applicable. A user character itself operated by the user does not have to be in a form like human being, a moving element itself may be operated, or an original user character may be operated.

A motor bicycle and/or a user character which rides on a motor bicycle will be described below by way of example of an "object". In the description below, an "object" may also simply be abbreviated as a "character".

In the game processing according to the present embodiment, at least such screen representation processing that a character 302 moves forward and turns left or right in accordance with an operation input by the user onto the operation portion (left controller 3 and/or right controller 4) is performed. Any operation button can be allocated to such an operation input of character 302.

By way of example, an "acceleration" function is allocated to X button 55 in right controller 4, and a "steering" function is allocated to analog stick 32 in left controller 3. When the user presses X button 55 in right controller 4, such a screen representation as moving character 302 forward (such a screen representation as movement toward the rear in virtual space 300) is provided. When the user operates analog stick 32 in left controller 3, such a screen representation that character 302 turns left or right in accordance with the direction of operation input is provided. Here, screen representation processing for character 302 to change its attitude as being inclined toward a direction of turning with respect to an attitude in linear movement thereof is performed. This expresses inclination of a vehicular body which takes place in a real motor bicycle making a turn.

The game processing as shown in FIGS. 12A, 12B, 13A, and 13B is typically implemented by execution by CPU 81 of a game program (which is stored in flash memory 84 or an external storage medium attached to first slot 23 or second slot 24) (see FIG. 7). CPU 81 of main body apparatus 2 functions as the screen representation control unit which provides such a screen representation that character 302 moving in virtual space 300 turns left in accordance with an operation input by the user onto the operation portion and such a screen representation that the character moving in virtual space 300 turns right in accordance with another operation input by the user onto the operation portion.

Figure 14A:
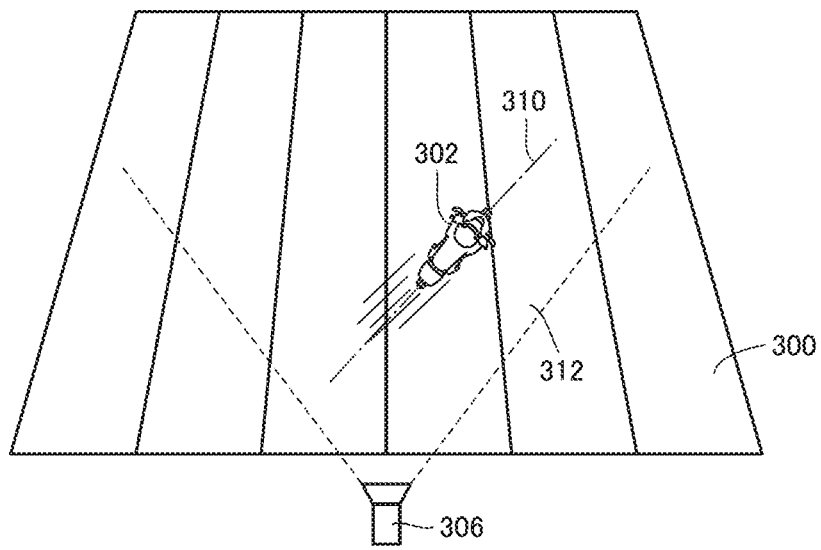
FIGS. 14A and 14B show exemplary illustrative non-limiting drawings illustrating processing involved with screen representation control in the game system according to the present embodiment.
Figure 14B:
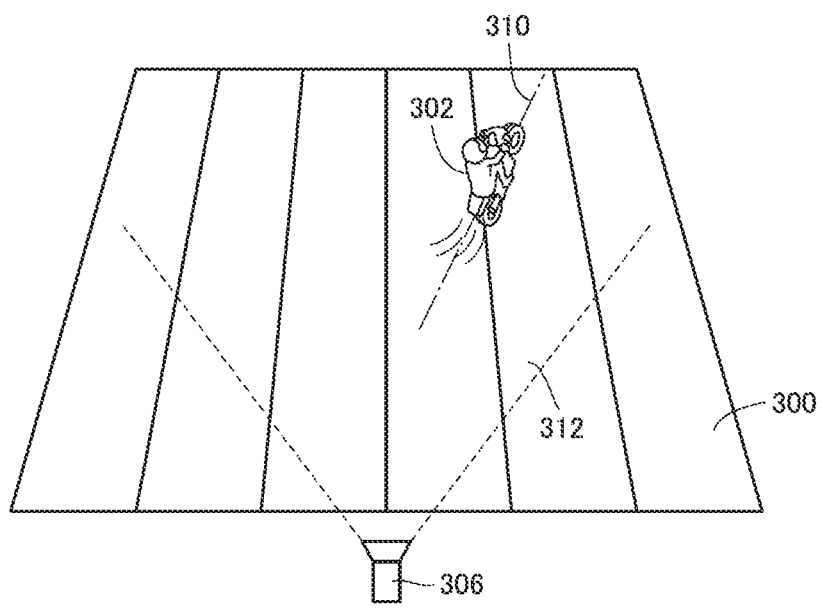

Processing involved with screen representation control in the game system according to the present embodiment will be described with reference to FIGS. 14A and 14B. As shown in FIGS. 14A and 14B, character 302 is arranged in virtual space 300. A movement control unit (corresponding to a movement control module 8421 in FIG. 21) representing one function of the representation control unit controls movement of character 302 in virtual space 300 in accordance with an operation input by the user.

"Control of movement" herein includes change in position of arrangement of an object to be controlled (character 302 in the example shown in FIGS. 14A and 14B) in accordance with some command. By way of example of control of movement, the movement control unit moves character 302 forward, that is, advances character 302 along a direction of travel 310 of character 302. By way of another example of control of movement, the movement control unit turns character 302 to the left or the right, that is, changes a direction of travel of character 302 with respect to immediately preceding direction of travel 310 of character 302.

Thus, the movement control unit controls movement of the object such that the object turns left with respect to the direction of travel of the object in accordance with an operation input by the user and controls movement of the object such that the object turns right with respect to the direction of travel of the object in accordance with another operation input by the user. When the "acceleration" function is allocated to X button 55 in right controller 4 and the "steering" function is allocated to analog stick 32 in left controller 3 as described above, the representation control unit controls the object to turn left or right with respect to the direction of travel of the object in accordance with an operation input by the user onto analog stick 32 (direction instruction portion) and controls the object to move forward in accordance with an operation input by the user onto X button 55 (operation portion) different from analog stick 32.

An image output unit (corresponding to an image output module 8422 in FIG. 21) representing one function of the representation control unit arranges a virtual camera 306 in virtual space 300 and outputs an image generated by shooting virtual space 300 with virtual camera 306. A position and an orientation of virtual camera 306 are controlled so as to include character 302 in a field of view 312 of virtual camera 306. Thus, image output means controls an orientation of virtual camera 306 such that virtual camera 306 can change a direction of shooting of an object. Then, an image output by the image output unit is shown and the game processing as shown in FIGS. 12A, 12B, 13A, and 13B is implemented.

By thus controlling movement of character 302 in accordance with an operation input by the user and outputting an image resulting from shooting of the character with virtual camera 306, such a screen representation that character 302 moves and turns is provided.

A screen representation of character 302 turning left or right encompasses an example in which character 302 turns to a left direction or a right direction with respect to a direction of travel thereof with character 302 being defined as the reference. A direction in which character 302 moves when it moves forward is defined as the direction of travel and change in direction of travel to the left direction or the right direction means turning to the left direction or the right direction.

Screen representation of character 302 turning left or right also encompasses an example in which the direction of travel of character 302 is changed to left or right with respect to a previous direction of travel with a prescribed period of time being spent, in addition to an example in which character 302 instantaneously changes a direction at a certain time point. In this case, an attitude of character 302 may be inclined totally or partly with respect to an axis perpendicular to the ground in the virtual space.

The expression of screen representation of turning left or right herein is used to mean a direction relative to a direction of travel with an object (a character) in a virtual space of interest being defined as the reference (that is, a point of view of an object being defined as the reference) unless otherwise specified.

In the present embodiment, as shown in FIGS. 14A and 14B, processing for controlling an orientation of virtual camera 306 separately from control of an orientation of an object (character 302) is adopted. When an object is shot always from the rear, a direction of turning of the object and the left-right direction on a display screen in a real space match with each other when an operation input to turn the object to left or right in virtual space 300 is performed. When an orientation of virtual camera 306 is controlled separately from control of an orientation of an object, however, virtual camera 306 shoots the object also from a direction other than the rear of the object, and at that time, a direction of turning of the object may not match with the left-right direction on the display screen in the real space when an operation input to turn the object to left or right is performed in virtual space 300. Even in such a case, according to the present embodiment, the user can appropriately feel in which direction the object has turned.

An attitude control unit (corresponding to an attitude control module 8423 in FIG. 21) may be mounted as one function of the representation control unit. The attitude control unit controls an attitude of character 302 in virtual space 300 in accordance with an operation input by the user. The "attitude" herein means an angle or an inclination of a part or the entirety of an object of interest (character 302 in the example shown in FIGS. 14A and 14B) with respect to a certain reference axis set in the virtual space. An axis perpendicular to the ground in the virtual space or the like is assumed as the reference axis. By way of example of control of the attitude, the attitude control unit provides such a screen representation that the attitude of the object moving in virtual space 300 is changed to left in accordance with an operation input by the user onto the operation portion and provides such a screen representation that the attitude of the object moving in virtual space 300 is changed to right in accordance with another operation input by the user onto the operation portion. Control of the attitude of the object by the attitude control unit may be in coordination with control of movement of the object by the movement control unit. For example, when the movement control unit provides such a screen representation that the object turns left, the object may be inclined inward to the left with respect to the direction of travel of the object. In contrast, when the movement control unit provides such a screen representation that the object turns right, the object may be inclined inward to the right with respect to the direction of travel of the object.

CPU 81 of main body apparatus 2 further functions as a vibration control unit which vibrates one vibration portion of vibration generation portions 108 and 118 more strongly than the other vibration portion when the representation control unit provides a screen representation of the object turning left and vibrates the other vibration portion more strongly than one vibration portion when the representation control unit provides a screen representation of the object turning right. Control of strength of vibration of vibration generation portions 108 and 118 as such will be exemplified below.

The present technical concept is applicable to any game processing so long as such a screen representation that an object in the virtual space turns left or right in accordance with an operation input by the user can be provided. For example, in addition to the game processing in which an object is arranged in the virtual space (that is, a 3D virtual space) having a depth direction as shown in FIGS. 12A, 12B, 13A, and 13B, the technical concept may be applicable to screen representation of movement of an object in the up-down direction of the screen (what is called vertical scroll) and screen representation of movement of an object in the left-right direction of the screen (what is called lateral scroll). Furthermore, game processing may allow selection from a plurality of points of view of a user. In this case, the present technical concept should only be applicable to at least one of selectable points of view of the user. Alternatively, a 3D space may be down shot so that an object can be shown as moving in up-down and left-right directions.

As in the game processing performed in game device 1 according to the present embodiment, in connection with the direction instruction portion (the analog stick and/or the operation button) which accepts an operation input to indicate a direction and is included in the operation portion, the representation control unit more preferably provides such a screen representation that the object turns left in accordance with an operation input by the user indicating the left direction onto the direction instruction portion and provides such a screen representation that the object turns right in accordance with another operation input by the user indicating the right direction onto the direction instruction portion.

Though the object moves in the virtual space in a direction in accordance with an operation input by the user depending on a manner of the virtual space (any of a 2D virtual space and a 3D virtual space) and a manner of game scrolling, a direction of movement of the object in the virtual space does not necessarily have to directly be associated with strength of vibration generated in each controller.

(d1: Processing Example 1)

Figure 12A:
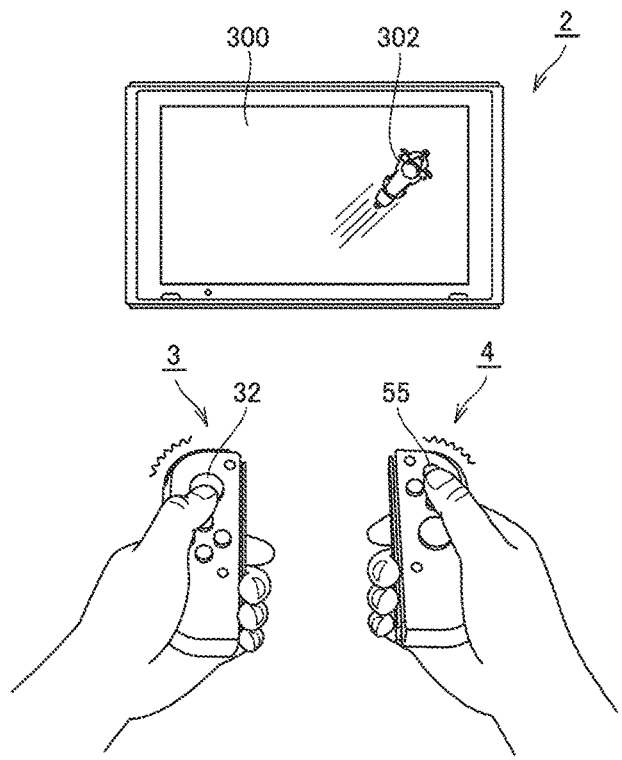
FIGS. 12A, 12B, 13A, and 13B show exemplary illustrative non-limiting drawings illustrating examples of game processing performed by a game system according to the present embodiment.
Figure 12B:
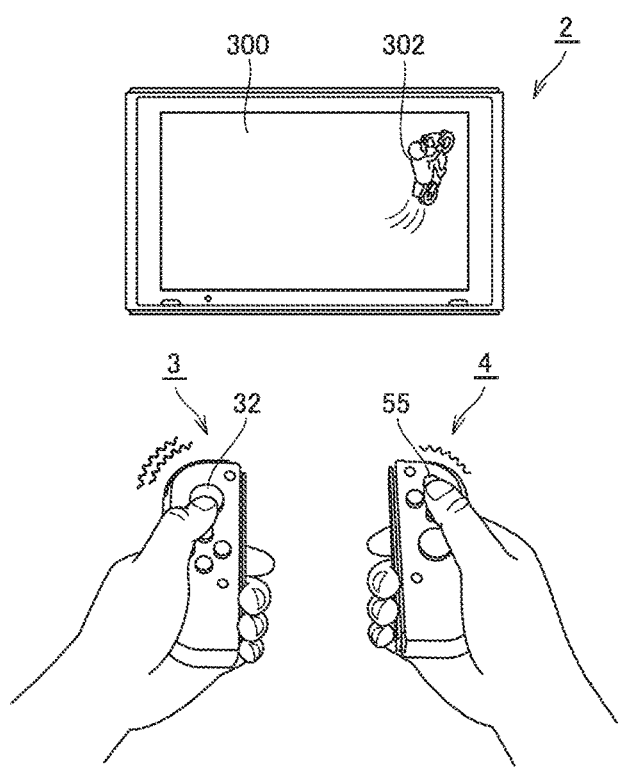

When an operation input to tilt analog stick 32 in left controller 3 to the left as shown in FIG. 12B is performed while character 302 moves straight in virtual space 300 as shown in FIG. 12A, character 302 turns left in virtual space 300 while it is inclined to the left.

In the game processing according to the present embodiment, vibration provided to the user is also changed simultaneously with such a screen representation that character 302 turns left or right. In a processing example 1 shown in FIGS. 12A and 12B, while character 302 moves straight, prescribed vibration is generated in both of the controllers, and when an operation input by the user to direct character 302 in any one direction is performed, vibration of the controller on a side of turning of character 302 is made stronger than vibration of the other controller. When character 302 turns left or right in a game space 300, vibration of the controller on a side of turning (a side corresponding to an inner side when character 302 turns) is made stronger than vibration of the other controller. Thus, for example, such an impression that force is applied in steering to a direction of turning can be given to a user and the user can appropriately be given vibration as making the user feel the character turning.

In the example shown in FIGS. 12A and 12B, when an operation input by the user to turn character 302 to the left is performed, the vibration portion in left controller 3 arranged in the portion held with the left hand of the user is vibrated more strongly than the vibration portion in right controller 4 arranged in the portion held with the right hand of the user. On the other hand, when an operation input by the user to turn character 302 to the right is performed, the vibration portion in right controller 4 is vibrated more strongly than the vibration portion of vibration generation portion 108 in left controller 3. In order to maintain consistency of strength of vibration, vibration of the vibration portion in the left controller is controlled to be stronger than before the operation input to turn left. Strength of vibration of the vibration portion in the right controller does not have to be changed, the vibration may be made stronger than before the operation input to turn left, or the strength of vibration may be increased within a range not more than strength of vibration of the left controller after the operation input to turn left.

When the attitude control unit controls an attitude of character 302 in coordination with control of movement of character 302 by the movement control unit, an attitude of character 302 is associated with strength of vibration. For example, when character 302 turns left or right, character 302 is inclined inward toward the side of turning and the vibration portion on the side of inclination inward or on a side opposite thereto may be vibrated more strongly than the other side in accordance with inclination inward. Thus, when the attitude control unit provides a screen representation that the attitude of the object is changed to the left, the vibration portion of one of left controller 3 and right controller 4 may be vibrated more strongly than the other vibration portion, and when the attitude control unit provides a screen representation that the attitude of the object is changed to the right, the other vibration portion may be vibrated more strongly than one vibration portion.

(d2: Processing Example 2)

Figure 13A:
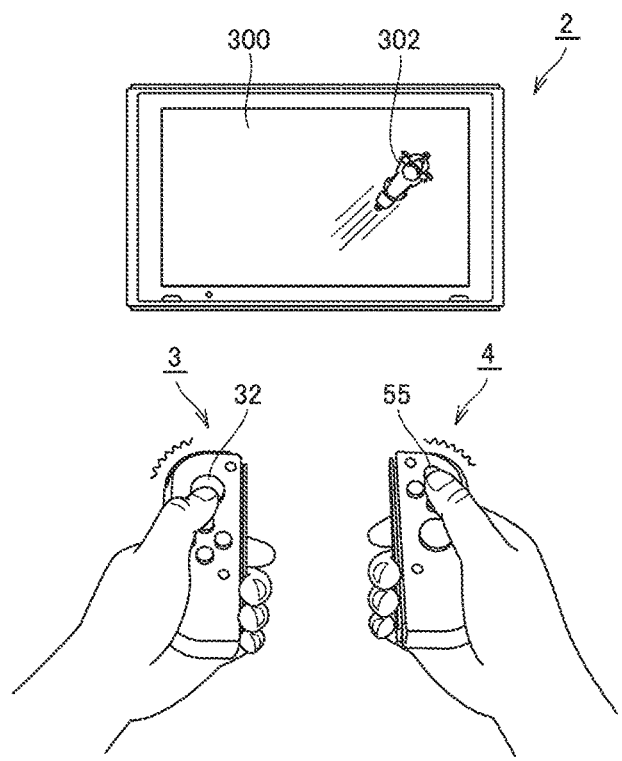
Figure 13B:
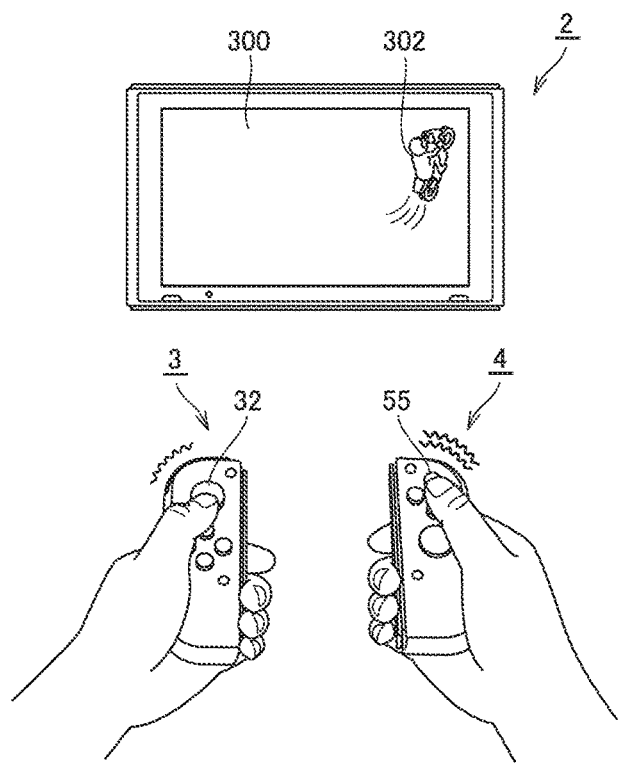

Another processing example of the subject disclosure will be described below as a modification. When the user performs an operation input to tilt analog stick 32 of left controller 3 to the left as shown in FIG. 13B while character 302 moves straight in virtual space 300 as shown in FIG. 13A, character 302 turns left in virtual space 300 while it is inclined to the left. Character 302 changes its direction of travel in accordance with the operation input by the user.

In the game processing according to the present embodiment, a degree of vibration given to the user is also changed in correspondence with processing for thus changing a direction of travel of character 302. In a processing example 2 shown in FIGS. 13A and 13B, while character 302 moves straight, prescribed vibration is generated in both of the controllers, and when an operation input by the user to tilt character 302 in any one direction is performed, vibration of the controller opposite to the side of tilt of character 302 is made stronger than vibration of the other controller. When character 302 turns left or right in virtual space 300, vibration of the controller opposite to the side of turning (a side corresponding to an outer side in turning of character 302) becomes stronger than vibration of the other controller.

In the example shown in FIGS. 13A and 13B, when an operation input by the user to change a direction of travel of character 302 to the left is performed, the vibration portion in right controller 4 arranged in the portion held with the right hand of the user is vibrated more strongly than the vibration portion in left controller 3 arranged in the portion held with the left hand of the user. When an operation input by the user to change a direction of travel of character 302 to the right is performed, the vibration portion of vibration generation portion 108 in left controller 3 is vibrated more strongly than the vibration portion in right controller 4. Thus, for example, such an impression that force is applied by centrifugal force in turning can be given to the user and the user can appropriately be given vibration as making the user feel the character turning.

One example of use in a detached state of the game processing according to the present embodiment will be described with reference to FIGS. 15A and 15B. In the example shown in FIGS. 15A and 15B, movement of character 302 is controlled in accordance with change in attitude of each of left controller 3 and right controller 4.

Figure 15A:
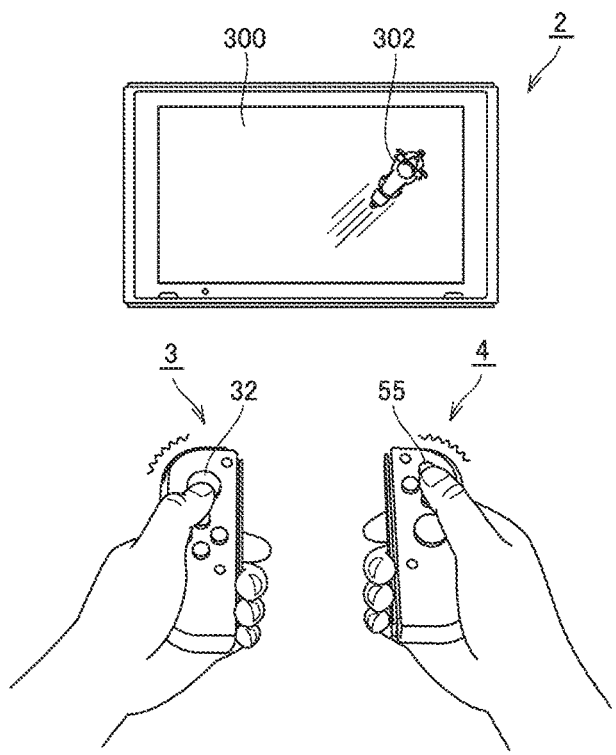
FIGS. 15A and 15B show exemplary illustrative non-limiting drawings illustrating examples of use of game processing according to the present embodiment in a detached state.
Figure 15B:
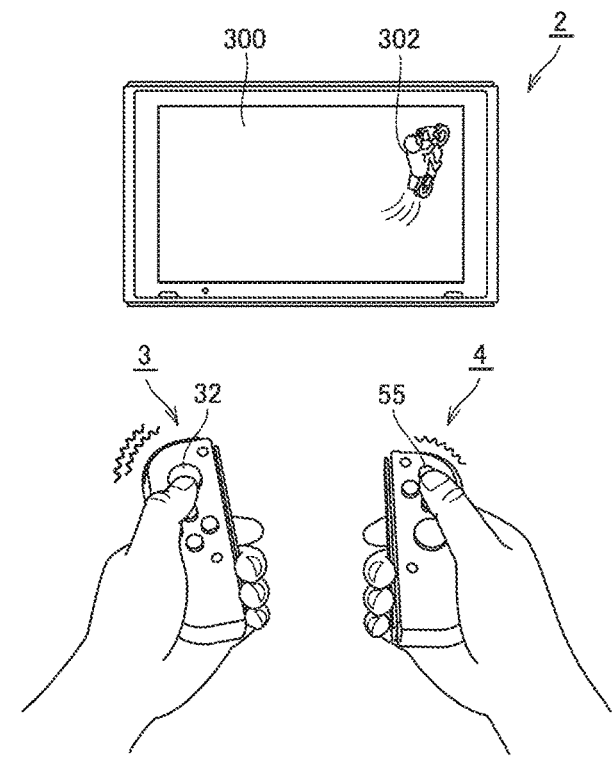

Referring to FIG. 15A, the user holds two controllers substantially horizontally with respective hands so that character 302 moves straight in virtual space 300. When the user tilts one controller as shown in FIG. 15B, an orientation of advance of character 302 in virtual space 300 is changed in correspondence with a direction of the tilted controller. Thus, since the two controllers function as a kind of steering in the detached state, the user can more intuitively operate character 302.

(d3: Use in Attached State)

Figure 16A:
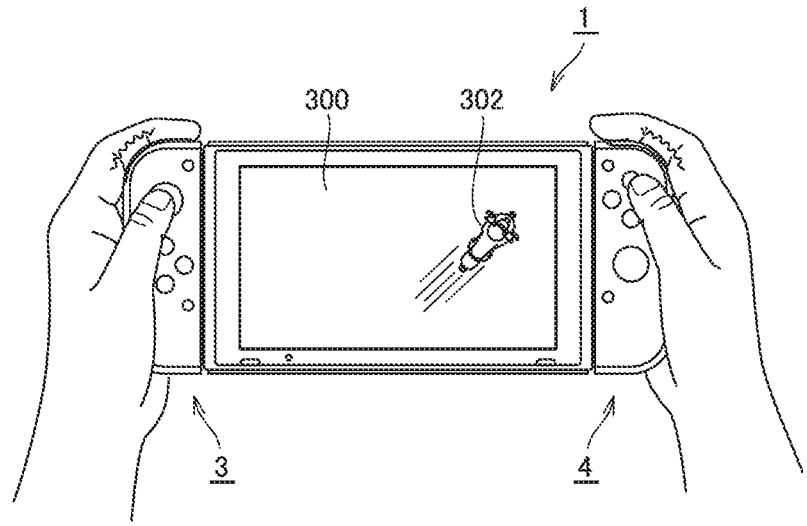
FIGS. 16A and 16B show exemplary illustrative non-limiting drawings illustrating examples of use of game processing according to the present embodiment in the attached state.

Though FIGS. 12A, 12B, 13A, and 13B exemplify a form of use of game device 1 in the detached state, game device 1 can be used also in the attached state. One example of use in the attached state of the game processing according to the present embodiment will be described with reference to FIGS. 16A and 16B. In the form of use shown in FIGS. 16A and 16B as well, for example, the user performs an acceleration operation input with left controller 3 and performs a steering operation input with right controller 4 as in FIGS. 12A, 12B, 13A, and 13B.

Figure 16B:
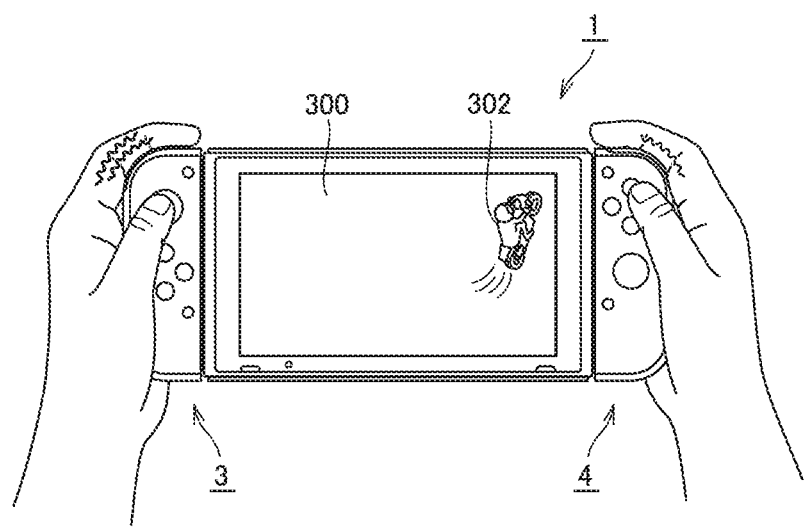

As in FIGS. 12A, 12B, 13A, and 13B, while character 302 moves straight, prescribed vibration is generated in both of the controllers (see FIG. 16A), and when an operation input by the user to turn character 302 in any one direction is performed, vibration of the controller on a side of turning of character 302 or opposite to the side of turning of character 302 is made stronger than vibration of the other controller (see FIG. 16B).

Since the user holds game device 1 at left controller 3 and right controller 4 also in the attached state, the user can feel with each hand, change in strength of vibration in accordance with change in direction of travel of character 302 as in the detached state. Therefore, the user can obtain an experience closer to the real by feeling vibration in accordance with progress of the game processing as in the detached state.

In the attached state, the user may operate character 302 by changing an attitude of game device 1 instead of performing an operation input onto the operation portion in left controller 3 and/or right controller 4.

Figure 17A:
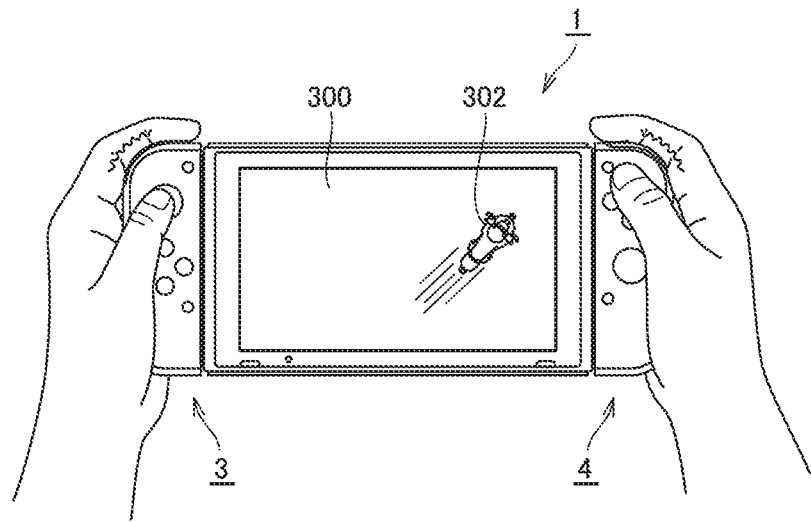
FIGS. 17A and 17B show exemplary illustrative non-limiting drawings illustrating other examples of use of game processing according to the present embodiment in the attached state.
Figure 17B:
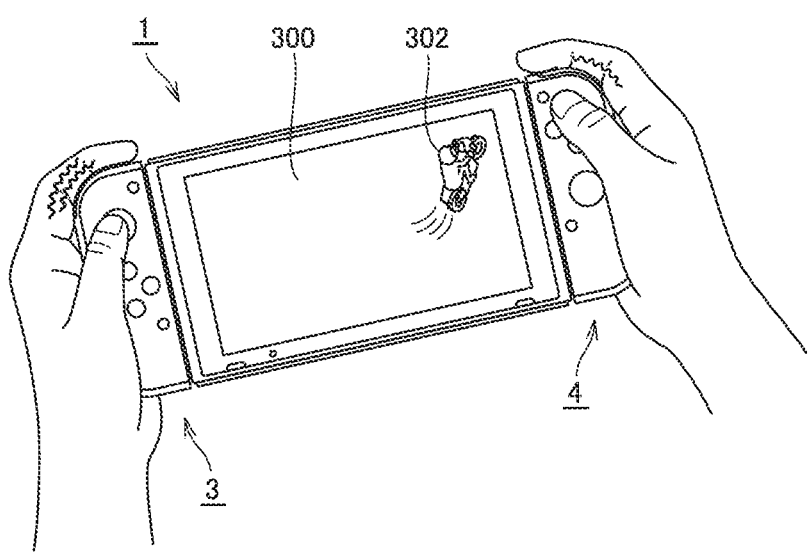

Another example of use in the attached state of the game processing according to the present embodiment will be described with reference to FIGS. 17A and 17B. In the attached state, as shown in FIG. 17A, the user holds game device 1 with the lateral direction of the display extending substantially horizontally so that character 302 moves straight in virtual space 300. When the user tilts game device 1 as shown in FIG. 17B, an orientation of advance of character 302 in virtual space 300 changes in correspondence with a direction of tilt of game device 1. Thus, since game device 1 functions as a kind of steering in the attached state, the user can more intuitively operate character 302.

(d4: Summary)

As shown in FIGS. 12A to 17A and 12B to 17B, in the present embodiment, the vibration portion in left controller 3 and the vibration portion in right controller 4 are capable of the first manner (detached state) in which the controllers are configured as being separately held with respective hands of the user and the second manner (attached state) in which the controllers are integrally configured. The operation portion including the vibration portion (left controller 3 and right controller 4) can be used even while it is attached to main body apparatus 2.

While left controller 3 and right controller 4 are attached to main body apparatus 2, a vibration control signal (vibration data) is transmitted from main body apparatus 2 to the vibration portion through a wire. While left controller 3 and right controller 4 are detached from main body apparatus 2, on the other hand, a vibration control signal (vibration data) is wirelessly transmitted from the main body to the vibration portion.

[E. Manner of Change in Strength of Vibration]

In the game processing according to the present embodiment, when an operation input by the user to change a direction of travel of character 302 to the left or the right is performed, strength of vibration felt by the user is varied between the left hand and the right hand in accordance with change in direction of travel. Various manners can be adopted as a method of changing strength of vibration or providing a difference in strength of vibration.

(e1: Change Over Time)

One example of a manner of change in strength of vibration in the game processing according to the present embodiment will be described with reference to FIGS. 18A to 18D. FIGS. 18A to 18D show examples of a manner of change at the time when vibration of left controller 3 is made stronger than vibration of right controller 4 as an operation by the user is performed. Though only an example in which vibration of the left controller is made stronger than vibration of the right controller is described for the sake of convenience of description, the manner of change in strength of vibration shown in FIGS. 18A to 18D can similarly be applied to an example in which vibration of right controller 4 is made stronger than vibration of left controller 3.

FIG. 18A shows an example in which strength s1 of vibration of vibration generation portion 108 in left controller 3 is controlled to substantially be equal to strength s2 of vibration of vibration generation portion 118 in right controller 4 before an operation input by the user. When a direction of travel of character 302 is changed to the left or the right as a result of an operation input by the user, strength of vibration of vibration generation portion 108 in left controller 3 is changed from s1 to s1' (s1'>s1). Strength s2 of vibration of vibration generation portion 118 in right controller 4 is maintained as it is.

By controlling the vibration portion in each of the controllers as shown in FIG. 18A, strength of vibration felt by the user can be varied between the left hand and the right hand in accordance with an operation input by the user to change a direction of travel of character 302 to the left or the right.

FIG. 18A shows change in strength of vibration in an example in which strength of vibration of vibration generation portion 118 in right controller 4 is maintained, which makes strength of vibration relatively lower, before and after an operation input by the user to turn character 302 to the left or the right. In other words, vibration generation portion 108 in left controller 3 vibrates stronger while vibration generation portion 118 in right controller 4 is kept vibrating. Before and after an operation input by the user to change a direction of travel of character 302 to the left or the right, strength of vibration of vibration generation portion 118 in right controller 4 is not changed. By adopting such a manner, the user can feel stronger vibration and can obtain an experience closer to the real by performing an operation input to turn character 302 to the left or the right.

FIG. 18B shows an example in which strength of vibration of the vibration portion in each of the controllers is increased when an operation input by the user is performed. By varying increase in strength of vibration, strength of vibration felt by the user is varied between the left hand and the right hand.

More specifically, before an operation input by the user, strength s1 of vibration of vibration generation portion 108 in left controller 3 is controlled to substantially be equal to strength s2 of vibration of vibration generation portion 118 in right controller 4. When a direction of travel of character 302 is changed to the left or the right by the operation input by the user, strength of vibration of vibration generation portion 108 in left controller 3 is changed from s1 to s1' (s1'>s1) and strength of vibration of vibration generation portion 118 in right controller 4 is changed from s2 to s2' (s2'>s2). Since an increment in strength of vibration is greater in left controller 3 (|s1'−s1|>|s2'−s2|), as a whole, the user feels stronger vibration from left controller 3 than from right controller 4.

In FIG. 18C, when an operation input by the user is performed, vibration of a controller different from one controller where stronger vibration is to be generated is weakened so that vibration generated in the vibration portion in one controller is relatively stronger.

More specifically, before an operation input by the user, strength s1 of vibration of vibration generation portion 108 in left controller 3 is controlled to substantially be equal to strength s2 of vibration of vibration generation portion 118 in right controller 4. When a direction of travel of character 302 is changed to the left or the right by the operation input by the user, strength s1 of vibration of vibration generation portion 108 in left controller 3 is maintained as it is. On the other hand, strength of vibration of vibration generation portion 118 in right controller 4 is changed from s2 to s2' (s2'<s2).

Since vibration of vibration generation portion 118 in right controller 4 is relatively weaker, as a whole, the user feels stronger vibration from left controller 3 (s1 >s2') than from right controller 4.

FIG. 18D shows an example in which vibration of the vibration portions in both of the controllers is weakened when an operation input by the user is performed. By varying a decrement in magnitude of vibration, strength of vibration felt by the user is varied between the left hand and the right hand.

More specifically, before an operation input by the user, strength s1 of vibration of vibration generation portion 108 in left controller 3 is controlled to substantially be equal to strength s2 of vibration of vibration generation portion 118 in right controller 4. When a direction of travel of character 302 is changed to the left or the right by the operation input by the user, strength of vibration of vibration generation portion 108 in left controller 3 is changed from s1 to s1' (s1'<s1) and strength of vibration of vibration generation portion 118 in right controller 4 is changed from s2 to s2' (s2'<s2). Here, since a decrement in strength of vibration is greater in right controller 4 (|s2'−s2|>|s1'−s1|), as a whole, the user feels stronger vibration from left controller 3 (s1'>s2') than from right controller 4.

(e2: Dependency on Operation by User)

Though FIGS. 18A to 18D described above illustrate an example in which vibration is changed depending on whether or not an operation input by the user is performed, magnitude of vibration may be changed in accordance with a degree of an operation input by the user. For example, by using an operation portion which accepts a direction instruction as an analog input value from the user such as the analog stick (analog stick 32 and/or analog stick 52) arranged in any controller, vibration can be increased in accordance with magnitude of the analog input value through the operation portion.

For example, the user tilts the stick member of the analog stick to a greater extent so that an input having magnitude in accordance with an angle of tilt is provided. In accordance with the input magnitude, vibration generated by one vibration generation portion is increased and the other vibration generation portion maintains vibration thereof. Vibration may be increased in proportion to an angle of tilt of the stick member of the analog stick, or magnitude of vibration may be changed with an angle of tilt of the stick member of the analog stick being multiplied by some function.

By adopting such processing, strength of vibration of one vibration portion may be changed in accordance with magnitude of an analog input value, whereas strength of vibration of the other vibration portion does not have to be changed even when magnitude of the analog input value is changed. Such difference in change in vibration increases vibration on the left and right sides as a whole, as compared with vibration before an operation input by the user, and dynamism in an operation input to the left or right side felt by the user increases.

(e3: Method of Expressing Change in Vibration)

A method of expressing change in vibration of the vibration portion in the controller will now be described. In the controller according to the present embodiment, a drive signal generated by an amplification unit is given to the vibrator (see FIG. 8). As the vibrator vibrates in accordance with the drive signal, the user can feel vibration from the controller. By controlling a drive signal provided to the vibrator, change in vibration can be expressed in the controller. For example, two methods below represent a method of expressing change in vibration.

A method of expressing change in vibration in game device 1 according to the present embodiment will be described with reference to FIG. 19. Though FIG. 19 shows an example in which the vibration portion in left controller 3 is vibrated more strongly than the vibration portion of right controller 4 for the sake of convenience of description, the method is similarly applicable also to an example in which the vibration portion in right controller 4 is vibrated more strongly than the vibration portion in left controller 3.

In any of left controller 3 and right controller 4, an alternating-current (AC) signal having a prescribed constant frequency is adopted as a drive signal to be given to the vibrator. When an operation input by the user to turn an object to the left or the right in the virtual space is performed in such a state, an amplitude of the drive signal for left controller 3 is made higher than before the operation input by the user. An amplitude of the drive signal for right controller 4 is maintained substantially the same before and after the operation input by the user. Thus, the game device according to the present embodiment adjusts strength of vibration by changing an amplitude of vibration of vibration generation portions 108 and 118 by way of example. By increasing an amplitude of the drive signal for vibrating the vibrator in left controller 3, vibration generated in left controller 3 can be increased.

Another method of expressing change in vibration in game device 1 according to the present embodiment will be described with reference to FIGS. 20A and 20B. Though FIGS. 20A and 20B show an example in which the vibration portion in left controller 3 is vibrated more strongly than the vibration portion in right controller 4 for the sake of convenience of description, the method is similarly applicable also to an example in which the vibration portion in right controller 4 is vibrated more strongly than the vibration portion in left controller 3.

Strength of vibration expressed in the controller as a result of vibration of the vibrator itself is dependent on characteristics of transmission from the vibrator to the controller. Depending on characteristics of a natural frequency of the vibration portion including the vibrator or of the controller as a whole, even though an amplitude is the same, stronger vibration is expressed with excitation at a frequency closer to a resonance frequency. In contrast, with excitation at a frequency farther from a resonance frequency, expressed vibration is weaker. By making use of such frequency characteristics, for example, by changing a frequency component included in a drive signal which vibrates the vibrator, strength of vibration expressed in the controller may be changed.

Figure 20A:
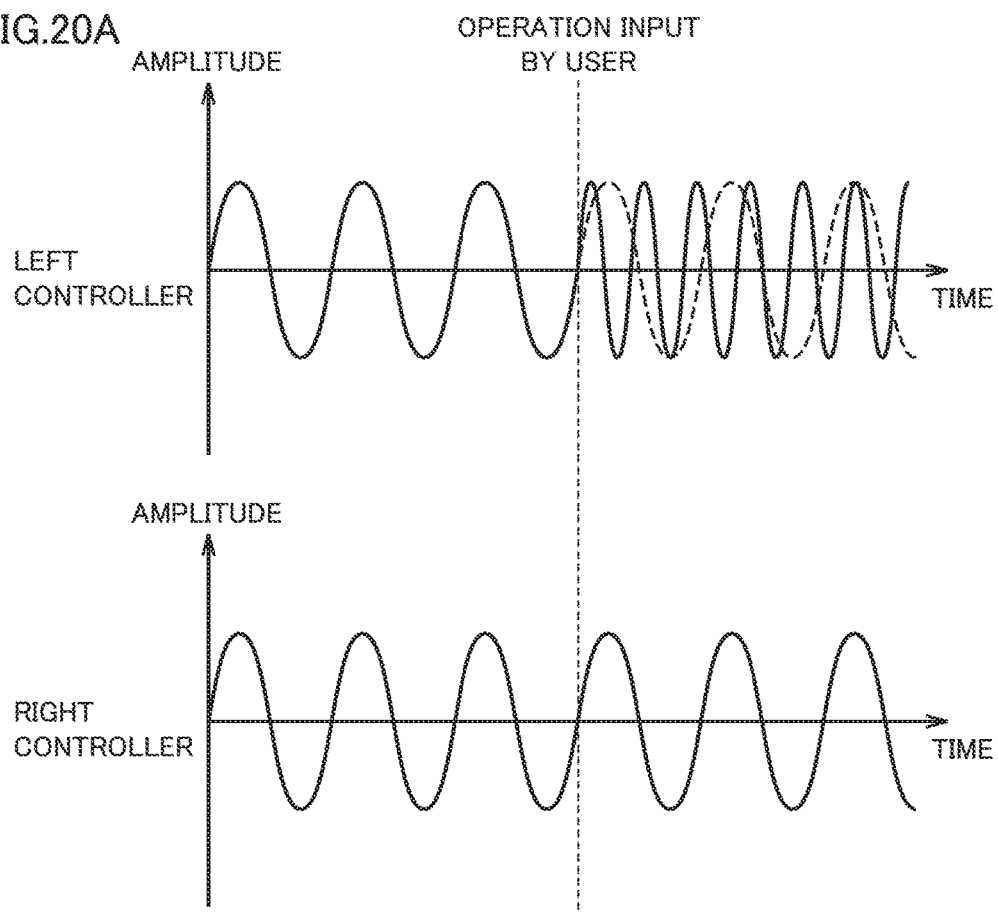
FIGS. 20A and 20B show exemplary illustrative non-limiting drawings illustrating other methods of expressing change in vibration in the game device according to the present embodiment.

As shown in FIG. 20A, in any of left controller 3 and right controller 4, an AC signal having a prescribed constant frequency (fa) is adopted as a drive signal to be given to the vibrator. When an operation input by the user to turn an object to the left or the right in the virtual space is performed in such a state, a frequency of a drive signal for left controller 3 is changed to a lower frequency (fb). An amplitude and a frequency of the drive signal for right controller 4 are maintained substantially the same before and after the operation input by the user.

Figure 20B:
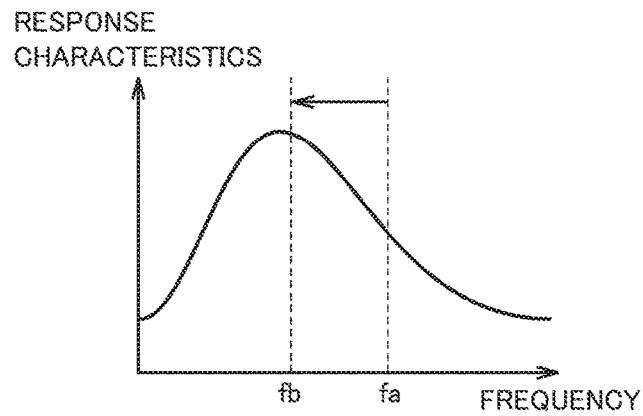

FIG. 20B shows one example of characteristics of a natural frequency of a controller including a vibrator. When responsiveness to frequency fb is higher than responsiveness to frequency fa as shown in FIG. 20B, vibration expressed in the controller increases by changing the drive signal from frequency fa to frequency fb.

Though FIG. 20A shows an example in which only a frequency for driving vibration is changed while an amplitude for driving vibration is maintained constant, magnitude of an amplitude may also be changed in accordance with a frequency. In this case, an amplitude may be in inverse proportion to a frequency.

[F. Mount Example of Game Processing]

A mount example of game processing according to the present embodiment will now be described.

A mount example involved with game processing according to the present embodiment will be described with reference to FIG. 21. As CPU 81 of main body apparatus 2 executes a program involved with game processing, a user input determination module 812, a representation control module 814, an audio control module 816, and a vibration control module 818 are implemented. The program involved with game processing is read, for example, from flash memory 84 of main body apparatus 2 or a memory card attached to the first slot, saved in DRAM 85, and executed.

User input determination module 812 determines a content of an operation input by the user based on data involved with the operation input by the user received from left controller 3 and/or right controller 4 and a result of detection by each sensor. The content of the operation input by the user determined by user input determination module 812 is given to representation control module 814, audio control module 816, and vibration control module 818.

Representation control module 814 is a module which controls screen representation involved with game processing and successively updates a content of representation on display 12 in accordance with the content of the operation input by the user. More specifically, representation control module 814 includes movement control module 8421 for functioning as the movement control unit described above, image output module 8422 for functioning as the image output unit described above, and attitude control module 8423 for functioning as the attitude control unit described above. Since the function and processing of each unit have been described above, detailed description will not be repeated.

Audio control module 816 is a module which controls audio output involved with game processing and successively outputs voice and sound to be given to the user in accordance with a content of the operation input by the user. Audio output from audio control module 816 is output to speaker 88 or audio input and output terminal 25 through codec circuit 87.

Vibration control module 818 is a module which controls vibration output involved with game processing and performs processing for changing strength of vibration as described above in accordance with a content of the operation input by the user. A vibration control signal generated through control by vibration control module 818 is transmitted to left controller 3 and/or right controller 4 through controller communication unit 83 or left terminal 17 or right terminal 21.

Vibration control module 818 can also change a vibration pattern or the like in accordance with development of the game processing. Specifically, vibration control module 818 can generate a vibration control signal based on a content of any pattern file 842 in accordance with development of the game processing by referring to pattern file 842. Pattern file 842 is a definition file including one vibration pattern or a plurality of vibration patterns, and a stored vibration pattern is selected as appropriate in accordance with progress of the game processing. Vibration characteristics (a frequency or an amplitude) in accordance with a game scene can be given to the user by switching between pattern files 842 to be referred to as appropriate.

A vibration control signal transmitted from main body apparatus 2 to a controller may be in any format so long as it includes information for controlling strength of vibration. In the present embodiment, by way of example, a scheme for designating a frequency and an amplitude of a drive signal for vibrating a vibrator is adopted. Only one set or a plurality of sets of a frequency and an amplitude of a drive signal may be designated. In each controller, a drive signal consisting of one AC signal or a drive signal which is combination of a plurality of AC signals having designated frequency and amplitude is generated and the vibrator is driven with the generated drive signal.

The vibration control signal is transmitted from main body apparatus 2 to left controller 3 and right controller 4. Left controller 3 and right controller 4 perform processing based on the received vibration control signal. Specifically, an amount of information exchanged between main body apparatus 2 and each controller can be compressed by adopting such a manner that vibration control module 818 generates a vibration control signal including an amplitude and a frequency for vibrating vibration generation portion 108 and a vibration control signal including an amplitude and a frequency for vibrating vibration generation portion 118.

More specifically, vibration control unit 107 in left controller 3 transmits a drive signal based on an amplitude $\alpha 1$ and a frequency f1 included in a vibration control signal and gives the generated drive signal to amplifier 106a so that vibrator 106b is driven.

Similarly, vibration control unit 117 in right controller 4 generates a drive signal based on an amplitude $\alpha 2$ and a frequency f included in a vibration control signal and gives the generated drive signal to amplifier 116a so that vibrator 116b is driven.

Thus, strength of vibration can be controlled as described above by adjusting each of amplitude $\alpha 1$, frequency f1, amplitude $\alpha 2$, and frequency f2 included in the vibration control signal transmitted from main body apparatus 2 to each controller.

One example of a communication sequence between main body apparatus 2 and the controllers in game device 1 according to the present embodiment will be described with reference to FIG. 22. During game processing, a vibration control signal (having amplitude $\alpha 1$ and frequency f1) is transmitted from main body apparatus 2 to left controller 3 and left controller 3 generates a drive signal. Similarly, a vibration control signal (having amplitude $\alpha 2$ and frequency f2) is transmitted from main body apparatus 2 to right controller 4 and right controller 4 generates a drive signal.

Transmission of a vibration control signal and generation of a drive signal in connection with driving are repeated during the game processing.

[G. Processing Procedure]

Figure 23:
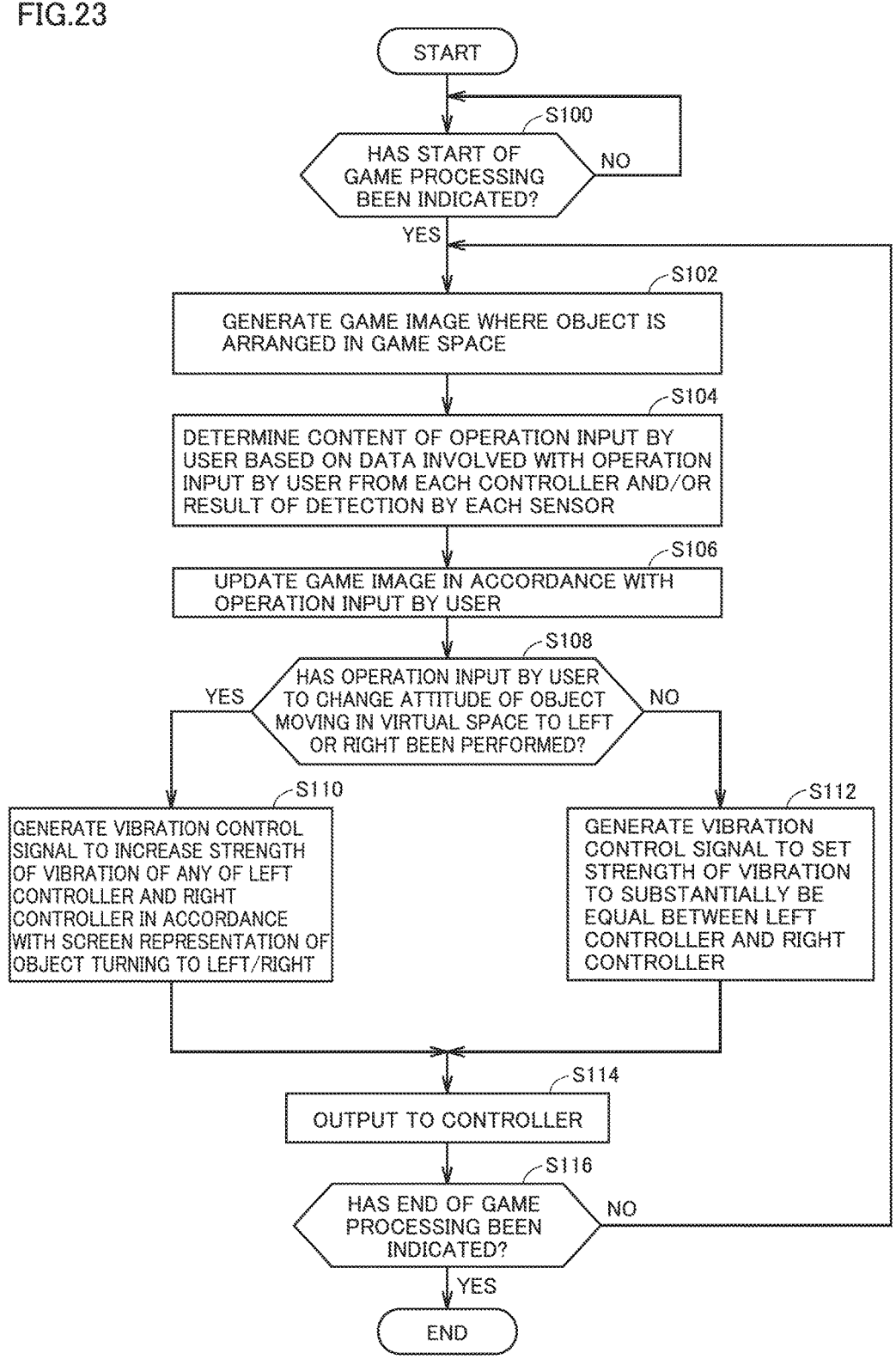
FIG. 23 shows an exemplary illustrative non-limiting flowchart illustrating a processing procedure involved with game processing in the game device according to the present embodiment.

A processing procedure involved with game processing in game device 1 according to the present embodiment will now be described. A processing procedure involved with game processing in game device 1 according to the present embodiment will be described with reference to FIG. 23. Each step shown in FIG. 23 is performed typically by execution of a program by CPU 81 of main body apparatus 2.

When start of game processing is indicated (YES in step S100), CPU 81 generates a game image where an object is arranged in the virtual space (step S102). Then, CPU 81 determines a content of an operation input by the user based on data involved with the operation input by the user from each controller and/or a result of detection by each sensor (step S104) and updates the game image in accordance with the operation input by the user (step S106). The processing for updating the game image may include update of a screen representation of movement of the object and a position and an orientation of the virtual camera in accordance with the operation input by the user.

CPU 81 determines whether or not the operation input by the user to change an attitude of the object which moves in the virtual space to the left or the right has been performed (step S108). When the operation input by the user to change the attitude of the object which moves in the virtual space to the left or the right has been performed (YES in step S108), CPU 81 generates a vibration control signal for increasing strength of vibration in any of left controller 3 and right controller 4 in accordance with a screen representation that the object turns to the left or a screen representation that the object turns to the right (step S110) and outputs the vibration control signal to each controller (step S114).

When the operation input by the user to change the attitude of the object which moves in the virtual space to the left or the right has not been performed (NO in step S108), CPU 81 generates a vibration control signal which sets strength of vibration to substantially be equal between left controller 3 and right controller 4 (step S112) and outputs the vibration control signal to each controller (step S114).

CPU 81 determines whether or not end of the game processing has been indicated (step S116). When end of the game processing has not been indicated (NO in step S116), processing in step S102 or later is repeated.

In contrast, when end of the game processing has been indicated (YES in step S116), the process ends.

[H. Advantages]

According to the game processing according to the present embodiment, the vibration portion is arranged in each of the portions held with hands of the user and the vibration portion is appropriately controlled so that an experience closer to the real can be given to the user. In particular, by changing strength of vibration given to each hand of the user in accordance with inclination of an object in the virtual space, reality as if the user were located in the virtual space can be enhanced.

According to the present embodiment, the user can perceive in which direction an object present in the virtual space travels based on a difference in strength of vibration felt with each hand of the user and easier progress of a game by the user can be supported.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A game system comprising:
   a first vibration portion arranged for one hand of a user and a second vibration portion arranged for the other hand of the user;
   an operation portion which accepts input from the user; and
   one or more processors operative to:
   provide a first screen representation in which an object moving in a virtual space turns left in accordance with a first operation input from the user via the operation portion, and provide a second screen representation in which the object moving in the virtual space turns right in accordance with a second operation input from the user via the operation portion, and
   vibrate the first vibration portion more strongly than the second vibration portion when providing the first screen representation in which the object turns left, and vibrate the second vibration portion more strongly than the first vibration portion when providing the second screen representation in which the object turns right.

2. The game system according to claim 1, wherein
   the operation portion includes a direction instruction portion which accepts input that indicates a direction, and
   the one or more processors are further operative to provide the first screen representation in which the object turns left to indicate a left direction input accepted via the direction instruction portion and to provide the second screen representation in which the object turns right to indicate a right direction input accepted via the direction instruction portion.

3. The game system according to claim 2, wherein the virtual space is a 3D virtual space.

4. The game system according to claim 2, wherein
   the one or more processors are further operative to
   control movement of the object in the virtual space in accordance with input provided by the user via the operation portion, and
   output an image generated by shooting the virtual space with a virtual camera,
   the controlling movement is practiced such that the object turns left with respect to a direction of travel of the object in accordance with the first operation input from the user and such that the object turns right with respect to the direction of travel of the object in accordance with the second operation input from the user, and
   the outputting of the image comprises controlling an orientation of the virtual camera such that a direction of shooting of the object is changeable.

5. The game system according to claim 2, wherein the one or more processors are further operative to control the object such that the object turns left or right with respect to a direction of travel of the object in accordance with input from the user via the direction instruction portion and control the object such that the object moves forward in accordance with different input from the user via the operation portion.

6. The game system according to claim 1, wherein the one or more processors are further operative to vibrate both the first and second vibration portions and to vibrate the first vibration portion more strongly, both before and after receiving the first or second operation input from the user via the operation portion.

7. The game system according to claim 6, wherein the one or more processors are further operative to keep vibration of the second vibration portion unchanged, both before and after receiving the first or second operation input from the user via the operation portion.

8. The game system according to claim 1, wherein the one or more processors are further operative to increase vibration of the first vibration and to make the vibration of the first vibration portion stronger than the second vibration portion.

9. The game system according to claim 1, wherein
   the operation portion is configured to accept a direction instruction as an analog input value, and
   the one or more processors are further operative to increase strength of vibration of the first vibration portion in accordance with a magnitude of the analog input value.

10. The game system according to claim 1, wherein the one or more processors are further operative to adjust strength of vibration by changing an amplitude while a frequency of vibration of the corresponding vibration portion is maintained.

11. The game system according to claim 1, wherein
    the operation portion includes a sensor configured to detect tilt of the operation portion caused by the user, and
    the one or more processors are further operative to provide the first and/or second screen representation in accordance with output from the sensor.

12. The game system according to claim 1, wherein the first screen representation shows the object tilted left when the object turns left and the second screen representation shows the object tilted right when the object turns right.

13. The game system according to claim 1, wherein an attitude of the object moving in the virtual space is changed to left in accordance with the first operation input, and the attitude of the object moving in the virtual space is changed to right in accordance with the second operation input by the user onto the operation portion.

14. The game system according to claim 13, wherein
    the operation portion is separate from a main body which performs game processing,
    the operation portion includes a first portion held with one hand of the user and a second portion held with the other hand of the user, the first and second portions being separate from each other, and the first vibration portion is arranged in the first portion and the second vibration portion is arranged in the second portion.

15. The game system according to claim 14, wherein
the main body includes a display configured to show the virtual space and the object in the virtual space,
the operation portion is detachably connectable to the main body,
the operation portion is usable to provide input to the main body regardless of whether the operation portion is attached to the main body, and
while the operation portion is attached to the main body, a vibration control signal is transmittable from the main body to the vibration portion through a wire, and
while the operation portion is detached from the main body, a vibration control signal is wirelessly transmittable from the main body to the vibration portion.

16. The game system according to claim 1, wherein the one or more processors are further operative to generate a first command including a first amplitude and a first frequency for vibrating the first vibration portion and a second command including a second amplitude and a second frequency for vibrating the second vibration portion.

17. The game system according to claim 1, wherein
the first vibration portion and the second vibration portion are configured for use in a first manner in which the first vibration portion and the second vibration portion are separate and are to be held with respective hands of the user, and in a second manner in which the first vibration portion and the second vibration portion are integrated with one another, and
the one or more processors are further operative to be able to vibrate the first vibration portion and the second vibration portion, regardless of whether the first and second vibration portions are used in the first or second manner.

18. A game system comprising:
a first vibration portion arranged in a portion held with one hand of a user and a second vibration portion arranged in a portion held with the other hand of the user;
an operation portion which accepts input from the user; and
one or more processors operative to:
provide a first screen representation in which an attitude of an object moving in a virtual space is changed to left in accordance with a first operation input from the user via the operation portion and provide a second screen representation in which the attitude of the object moving in the virtual space is changed to right in accordance with a second operation input from the user via the operation portion, and
vibrate the first vibration portion more strongly than the second vibration portion when the first screen representation in which the attitude of the object is changed to the left is provided and vibrate the second vibration portion more strongly than the first vibration portion when the second screen representation in which the attitude of the object is changed to the right is provided.

19. A method performed in a game device including a first vibration portion arranged in a portion held with one hand of a user and a second vibration portion arranged in a portion held with the other hand of the user, the method comprising:

accepting input from the user;
providing a first screen representation in which an object moving in a virtual space turns left in accordance with a first operation input from the user;
providing a second screen representation in which the object moving in the virtual space turns right in accordance with a second operation input from the user;
vibrating the first vibration portion more strongly than the second vibration portion when the first screen representation in which the object turns left is provided; and
vibrating the second vibration portion more strongly than the first vibration portion when the second screen representation in which the object turns right is provided.

20. A non-transitory computer-readable storage medium with an executable game program stored thereon, the game program being executed in a processor of a game device including a first vibration portion arranged in a portion held with one hand of a user and a second vibration portion arranged in a portion held with the other hand of the user, the game program causing the processor to perform:
accepting input from the user;
providing a first screen representation in which an object moving in a virtual space turns left in accordance with a first operation input from the user;
providing a second screen representation in which the object moving in the virtual space turns right in accordance with a second operation input from the user;
vibrating the first vibration portion more strongly than the second vibration portion when the first screen representation in which the object turns left is provided; and
vibrating the second vibration portion more strongly than the first vibration portion when the second screen representation in which the object turns right is provided.

21. The game system according to claim 1, wherein the first and second vibration portions vibrate in equal non-zero amounts when changing object virtual position without turning.

22. The game system according to claim 1, wherein the turning is accompanied by a change in object virtual position.

23. The game system according to claim 1, wherein selective vibration of the first and second vibration portions simulates a force associated with the turning.

24. The game system according to claim 18, wherein the first and second vibration portions vibrate in equal non-zero amounts when changing object virtual position when the attitude is neutral.

25. The game system according to claim 18, wherein attitude changes to the left and to the right are accompanied by a change in object virtual position.

26. The game system according to claim 18, wherein
an amount of vibration of the second vibration portion is non-zero when the first screen representation is provided while an amount of vibration of the first vibration portion is increased, and
the amount of vibration of the first vibration portion is non-zero when the second screen representation is provided while the amount of vibration of the second vibration portion is increased.

27. The method of claim 19, wherein the first and second vibration portions vibrate in equal non-zero amounts when changing object virtual position without turning.

28. The method of claim 19, wherein the turning is accompanied by a change in object virtual position.

29. The method of claim 19, wherein selective vibration of the first and second vibration portions simulates a force associated with the turning.

30. The non-transitory computer-readable storage medium of claim 20, wherein the first and second vibration portions vibrate in equal non-zero amounts when changing virtual position without turning.

31. The non-transitory computer-readable storage medium of claim 20, wherein the turning is accompanied by a change in object virtual position.

32. The non-transitory computer-readable storage medium of claim 20, wherein selective vibration of the first and second vibration portions simulates a force associated with the turning.

33. A game system comprising:
   first and second vibrators spatially separated from each other; and
   one or more processors operative to:
      provide a first screen effect in which an object rotates left in a virtual space in accordance with a first input,
      provide a second screen effect in which an object rotates right in the virtual space in accordance with a second input,
      vibrate both the first and second vibrators while vibrating the first vibrator more strongly than the second vibrator and providing the first screen effect, and
      vibrate both the first and second vibrators while vibrating the second vibrator more strongly than the first vibrator and providing the second screen effect.

34. The game system of claim 33, wherein the first vibrator is arranged for the user's left hand and the second vibrator is arranged for the user's right hand.

35. The game system of claim 33, wherein rotations are accompanied by changes in object virtual position.

* * * * *